US007593550B2

(12) United States Patent
Hamza

(10) Patent No.: US 7,593,550 B2
(45) Date of Patent: Sep. 22, 2009

(54) DISTANCE IRIS RECOGNITION

(75) Inventor: Rida M. Hamza, Maple Grove, MN (US)

(73) Assignee: Honeywell International Inc., Morristown, NJ (US)

( * ) Notice: Subject to any disclaimer, the term of this patent is extended or adjusted under 35 U.S.C. 154(b) by 520 days.

(21) Appl. No.: 11/275,703

(22) Filed: Jan. 25, 2006

(65) Prior Publication Data

US 2007/0036397 A1    Feb. 15, 2007

Related U.S. Application Data

(63) Continuation-in-part of application No. 11/043,366, filed on Jan. 26, 2005.

(60) Provisional application No. 60/647,270, filed on Jan. 26, 2005.

(51) Int. Cl.
*G06K 9/00* (2006.01)
(52) U.S. Cl. .................................................. 382/117
(58) Field of Classification Search .............. 382/117; 348/78; 396/18, 51
See application file for complete search history.

(56) References Cited

U.S. PATENT DOCUMENTS

| 4,641,349 A |   | 2/1987  | Flom et al.        |
|-------------|---|---------|--------------------|
| 5,291,560 A |   | 3/1994  | Daugman            |
| 5,293,427 A |   | 3/1994  | Ueno et al.        |
| 5,543,887 A | * | 8/1996  | Akashi ...... 396/51 |
| 5,572,596 A |   | 11/1996 | Wildes et al.      |
| 5,608,472 A |   | 3/1997  | Szirth et al.      |
| 5,671,447 A | * | 9/1997  | Tokunaga ...... 396/51 |
| 5,717,512 A |   | 2/1998  | Chmielewski, Jr. et al. |
| 5,751,836 A |   | 5/1998  | Wildes et al.      |
| 5,859,686 A |   | 1/1999  | Aboutalib et al.   |
| 5,901,238 A |   | 5/1999  | Matsuhita          |
| 5,953,440 A |   | 9/1999  | Zhang et al.       |
| 5,956,122 A |   | 9/1999  | Doster             |
| 5,978,494 A |   | 11/1999 | Zhang              |
| 5,991,429 A | * | 11/1999 | Coffin et al. ...... 382/118 |
| 6,005,704 A |   | 12/1999 | Chmielewski et al. |
| 6,007,202 A |   | 12/1999 | Apple et al.       |

(Continued)

FOREIGN PATENT DOCUMENTS

EP        0878780       11/1998

(Continued)

OTHER PUBLICATIONS

Cui et al., "A Fast and Robust Iris Localization Method Based on Texture Segmentation," 8 pages, prior to Jan. 25, 2006.

(Continued)

*Primary Examiner*—Brian Q Le
(74) *Attorney, Agent, or Firm*—Kris T. Fredrick

(57) ABSTRACT

A system for one dimensional segmentation of an iris of an eye into a map of the iris and classification of the map into unaffected areas and affected areas. Also, the system may provide for regular shape fitting of the areas for normalization and identifying the unaffected areas as symmetric segments. Further, the system may assign weights to the unaffected areas and the affected areas of the map of the iris and an enrolled map of an iris and their corresponding bins for matching purposes.

35 Claims, 13 Drawing Sheets

U.S. PATENT DOCUMENTS

| | | | |
|---|---|---|---|
| 6,021,210 A | 2/2000 | Camus et al. | |
| 6,028,949 A | 2/2000 | McKendall | |
| 6,055,322 A | 4/2000 | Salganicoff et al. | |
| 6,064,752 A | 5/2000 | Rozmus et al. | |
| 6,069,967 A | 5/2000 | Rozmus et al. | |
| 6,081,607 A * | 6/2000 | Mori et al. | 382/110 |
| 6,088,470 A | 7/2000 | Camus et al. | |
| 6,091,899 A | 7/2000 | Konishi et al. | |
| 6,101,477 A | 8/2000 | Hohle et al. | |
| 6,104,431 A | 8/2000 | Inoue et al. | |
| 6,108,636 A | 8/2000 | Yap et al. | |
| 6,119,096 A | 9/2000 | Mann et al. | |
| 6,120,461 A | 9/2000 | Smyth | |
| 6,144,754 A | 11/2000 | Okano et al. | |
| 6,246,751 B1 | 6/2001 | Bergl et al. | |
| 6,247,813 B1 | 6/2001 | Kim et al. | |
| 6,252,977 B1 | 6/2001 | Salganicoff et al. | |
| 6,282,475 B1 | 8/2001 | Washington | |
| 6,285,505 B1 | 9/2001 | Melville et al. | |
| 6,285,780 B1 | 9/2001 | Yamakita et al. | |
| 6,289,113 B1 | 9/2001 | McHugh et al. | |
| 6,299,306 B1 | 10/2001 | Braithwaite et al. | |
| 6,308,015 B1 | 10/2001 | Matsumoto | |
| 6,309,069 B1 | 10/2001 | Seal et al. | |
| 6,320,610 B1 | 11/2001 | Van Sant et al. | |
| 6,320,973 B2 | 11/2001 | Suzaki et al. | |
| 6,323,761 B1 | 11/2001 | Son | |
| 6,325,765 B1 | 12/2001 | Hay et al. | |
| 6,330,674 B1 | 12/2001 | Angelo et al. | |
| 6,332,193 B1 | 12/2001 | Glass et al. | |
| 6,344,683 B1 | 2/2002 | Kim | |
| 6,370,260 B1 | 4/2002 | Pavlidis et al. | |
| 6,377,699 B1 | 4/2002 | Musgrave et al. | |
| 6,400,835 B1 | 6/2002 | Lemelson et al. | |
| 6,424,727 B1 | 7/2002 | Musgrave et al. | |
| 6,424,845 B1 | 7/2002 | Emmoft et al. | |
| 6,433,818 B1 | 8/2002 | Steinberg et al. | |
| 6,438,752 B1 | 8/2002 | McClard | |
| 6,441,482 B1 | 8/2002 | Foster | |
| 6,446,045 B1 | 9/2002 | Stone et al. | |
| 6,483,930 B1 | 11/2002 | Musgrave et al. | |
| 6,484,936 B1 | 11/2002 | Nicoll et al. | |
| 6,490,443 B1 | 12/2002 | Freeny, Jr. | |
| 6,493,363 B1 | 12/2002 | Roger et al. | |
| 6,493,669 B1 | 12/2002 | Curry et al. | |
| 6,494,363 B1 | 12/2002 | Roger et al. | |
| 6,503,163 B1 | 1/2003 | Van Sant et al. | |
| 6,505,193 B1 | 1/2003 | Musgrave et al. | |
| 6,516,078 B1 | 2/2003 | Yang et al. | |
| 6,516,087 B1 | 2/2003 | Camus | |
| 6,516,416 B2 | 2/2003 | Gregg et al. | |
| 6,522,772 B1 | 2/2003 | Morrison et al. | |
| 6,526,160 B1 | 2/2003 | Ito | |
| 6,532,298 B1 | 3/2003 | Cambier et al. | |
| 6,540,392 B1 | 4/2003 | Braithwaite | |
| 6,542,624 B1 | 4/2003 | Oda | |
| 6,546,121 B1 | 4/2003 | Oda | |
| 6,553,494 B1 | 4/2003 | Glass | |
| 6,580,356 B1 | 6/2003 | Alt et al. | |
| 6,591,001 B1 | 7/2003 | Oda et al. | |
| 6,591,064 B2 | 7/2003 | Higashiyama et al. | |
| 6,594,377 B1 | 7/2003 | Kim et al. | |
| 6,594,399 B1 | 7/2003 | Camus et al. | |
| 6,598,971 B2 | 7/2003 | Cleveland | |
| 6,614,919 B1 * | 9/2003 | Suzaki et al. | 382/117 |
| 6,652,099 B2 | 11/2003 | Chae et al. | |
| 6,674,367 B2 | 1/2004 | Sweatte | |
| 6,690,997 B2 | 2/2004 | Rivalto | |
| 6,708,176 B2 | 3/2004 | Strunk et al. | |
| 6,714,665 B1 | 3/2004 | Hanna et al. | |
| 6,718,049 B2 | 4/2004 | Pavlidis et al. | |
| 6,718,050 B1 * | 4/2004 | Yamamoto | 382/117 |
| 6,732,278 B2 | 5/2004 | Baird, III et al. | |
| 6,734,783 B1 | 5/2004 | Anbai | |
| 6,745,520 B2 | 6/2004 | Puskaric et al. | |
| 6,751,733 B1 | 6/2004 | Nakamura et al. | |
| 6,753,919 B1 | 6/2004 | Daugman | |
| 6,754,640 B2 | 6/2004 | Bozeman | |
| 6,760,467 B1 | 7/2004 | Min et al. | |
| 6,765,470 B2 | 7/2004 | Shinzaki | |
| 6,766,041 B2 | 7/2004 | Golden et al. | |
| 6,775,774 B1 | 8/2004 | Harper | |
| 6,785,406 B1 | 8/2004 | Kamada | |
| 6,793,134 B2 | 9/2004 | Clark | |
| 6,819,219 B1 | 11/2004 | Bolle et al. | |
| 6,829,370 B1 | 12/2004 | Pavlidis et al. | |
| 6,832,044 B2 | 12/2004 | Doi et al. | |
| 6,836,554 B1 | 12/2004 | Bolle et al. | |
| 6,837,436 B2 | 1/2005 | Swartz et al. | |
| 6,845,479 B2 | 1/2005 | Illman | |
| 6,853,444 B2 | 2/2005 | Haddad | |
| 6,867,683 B2 | 3/2005 | Calvesio et al. | |
| 6,873,960 B1 | 3/2005 | Wood et al. | |
| 6,896,187 B2 | 5/2005 | Stockhammer | |
| 6,905,411 B2 | 6/2005 | Nguyen et al. | |
| 6,920,237 B2 | 7/2005 | Chen et al. | |
| 6,930,707 B2 | 8/2005 | Bates et al. | |
| 6,934,849 B2 | 8/2005 | Kramer et al. | |
| 6,954,738 B2 | 10/2005 | Wang et al. | |
| 6,957,341 B2 | 10/2005 | Rice et al. | |
| 6,972,797 B2 | 12/2005 | Izumi | |
| 7,053,948 B2 | 5/2006 | Konishi | |
| 7,184,577 B2 | 2/2007 | Chen et al. | |
| 2001/0026632 A1 | 10/2001 | Tamai | |
| 2001/0027116 A1 | 10/2001 | Baird | |
| 2001/0047479 A1 | 11/2001 | Bromba et al. | |
| 2001/0051924 A1 | 12/2001 | Uberti | |
| 2001/0054154 A1 | 12/2001 | Tam | |
| 2002/0010857 A1 | 1/2002 | Karthik | |
| 2002/0033896 A1 | 3/2002 | Hatano | |
| 2002/0039433 A1 | 4/2002 | Shin | |
| 2002/0040434 A1 | 4/2002 | Elliston et al. | |
| 2002/0062280 A1 | 5/2002 | Zachariassen et al. | |
| 2002/0077841 A1 | 6/2002 | Thompson | |
| 2002/0089157 A1 | 7/2002 | Breed et al. | |
| 2002/0106113 A1 | 8/2002 | Park | |
| 2002/0112177 A1 | 8/2002 | Voltmer et al. | |
| 2002/0114495 A1 | 8/2002 | Chen et al. | |
| 2002/0130961 A1 | 9/2002 | Lee et al. | |
| 2002/0131622 A1 | 9/2002 | Lee et al. | |
| 2002/0139842 A1 | 10/2002 | Swaine | |
| 2002/0140715 A1 | 10/2002 | Smet | |
| 2002/0142844 A1 | 10/2002 | Kerr | |
| 2002/0144128 A1 | 10/2002 | Rahman et al. | |
| 2002/0150281 A1 | 10/2002 | Cho | |
| 2002/0154794 A1 | 10/2002 | Cho | |
| 2002/0158750 A1 | 10/2002 | Almalik | |
| 2002/0164054 A1 | 11/2002 | Mccartney et al. | |
| 2002/0175182 A1 | 11/2002 | Matthews | |
| 2002/0186131 A1 | 12/2002 | Fettis | |
| 2002/0191075 A1 | 12/2002 | Doi et al. | |
| 2002/0191076 A1 | 12/2002 | Wada et al. | |
| 2002/0194128 A1 | 12/2002 | Maritzen et al. | |
| 2002/0194131 A1 | 12/2002 | Dick | |
| 2002/0198731 A1 | 12/2002 | Barnes et al. | |
| 2003/0002714 A1 | 1/2003 | Wakiyama | |
| 2003/0012413 A1 | 1/2003 | Kusakari et al. | |
| 2003/0014372 A1 | 1/2003 | Wheeler et al. | |
| 2003/0020828 A1 | 1/2003 | Ooi et al. | |
| 2003/0038173 A1 | 2/2003 | Blackson et al. | |
| 2003/0046228 A1 | 3/2003 | Berney | |
| 2003/0053663 A1 | 3/2003 | Chen et al. | |
| 2003/0055689 A1 | 3/2003 | Block et al. | |
| 2003/0055787 A1 | 3/2003 | Fujii | |

| | | | | | | |
|---|---|---|---|---|---|---|
| 2003/0058492 A1 | 3/2003 | Wakiyama | 2004/0010462 A1 | 1/2004 | Moon et al. | |
| 2003/0061172 A1 | 3/2003 | Robinson | 2004/0012760 A1 | 1/2004 | Mihashi et al. | |
| 2003/0061233 A1 | 3/2003 | Manasse et al. | 2004/0019570 A1 | 1/2004 | Bolle et al. | |
| 2003/0065626 A1 | 4/2003 | Allen | 2004/0023664 A1 | 2/2004 | Mirouze et al. | |
| 2003/0071743 A1 | 4/2003 | Seah et al. | 2004/0023709 A1 | 2/2004 | Beaulieu et al. | |
| 2003/0072475 A1 | 4/2003 | Tamori | 2004/0025030 A1 | 2/2004 | Corbett-Clark et al. | |
| 2003/0073499 A1 | 4/2003 | Reece | 2004/0025031 A1 | 2/2004 | Ooi et al. | |
| 2003/0074317 A1 | 4/2003 | Hofi | 2004/0025053 A1 | 2/2004 | Hayward | |
| 2003/0074326 A1 | 4/2003 | Byers | 2004/0029564 A1 | 2/2004 | Hodge | |
| 2003/0076161 A1 | 4/2003 | Tisse | 2004/0030930 A1 | 2/2004 | Nomura | |
| 2003/0076300 A1 | 4/2003 | Lauper et al. | 2004/0035123 A1 | 2/2004 | Kim et al. | |
| 2003/0076984 A1 | 4/2003 | Tisse et al. | 2004/0037450 A1 | 2/2004 | Bradski | |
| 2003/0080194 A1 | 5/2003 | O'Hara et al. | 2004/0039914 A1 | 2/2004 | Barr et al. | |
| 2003/0091215 A1 | 5/2003 | Lauper et al. | 2004/0042641 A1 | 3/2004 | Jakubowski | |
| 2003/0092489 A1 | 5/2003 | Veradej | 2004/0044627 A1 | 3/2004 | Russell et al. | |
| 2003/0095689 A1 | 5/2003 | Volkommer et al. | 2004/0046640 A1 | 3/2004 | Jourdain et al. | |
| 2003/0098776 A1 | 5/2003 | Friedli | 2004/0049687 A1 | 3/2004 | Orsini et al. | |
| 2003/0099379 A1 | 5/2003 | Monk et al. | 2004/0050924 A1 | 3/2004 | Mletzko et al. | |
| 2003/0099381 A1 | 5/2003 | Ohba | 2004/0050930 A1 | 3/2004 | Rowe | |
| 2003/0103652 A1 | 6/2003 | Lee et al. | 2004/0052405 A1 | 3/2004 | Walfridsson | |
| 2003/0107097 A1 | 6/2003 | McArthur et al. | 2004/0052418 A1 | 3/2004 | DeLean | |
| 2003/0107645 A1 | 6/2003 | Yoon | 2004/0059590 A1 | 3/2004 | Mercredi et al. | |
| 2003/0108224 A1 | 6/2003 | Ike | 2004/0059953 A1 | 3/2004 | Purnell | |
| 2003/0108225 A1 | 6/2003 | Li | 2004/0104266 A1 | 6/2004 | Bolle et al. | |
| 2003/0115148 A1 | 6/2003 | Takhar | 2004/0114782 A1* | 6/2004 | Cho | 382/117 |
| 2003/0115459 A1 | 6/2003 | Monk | 2004/0117636 A1 | 6/2004 | Cheng | |
| 2003/0116630 A1 | 6/2003 | Carey et al. | 2004/0133804 A1 | 7/2004 | Smith et al. | |
| 2003/0118212 A1 | 6/2003 | Min et al. | 2004/0146187 A1 | 7/2004 | Jeng | |
| 2003/0118217 A1 | 6/2003 | Kondo et al. | 2004/0148526 A1 | 7/2004 | Sands et al. | |
| 2003/0123711 A1 | 7/2003 | Kim et al. | 2004/0160518 A1 | 8/2004 | Park | |
| 2003/0125054 A1 | 7/2003 | Garcia | 2004/0162870 A1 | 8/2004 | Matsuzaki et al. | |
| 2003/0125057 A1 | 7/2003 | Pesola | 2004/0162984 A1 | 8/2004 | Freeman et al. | |
| 2003/0126560 A1 | 7/2003 | Kurapati et al. | 2004/0169817 A1 | 9/2004 | Grotehusmann et al. | |
| 2003/0131245 A1 | 7/2003 | Linderman | 2004/0172541 A1 | 9/2004 | Ando et al. | |
| 2003/0131265 A1 | 7/2003 | Bhakta | 2004/0174070 A1 | 9/2004 | Voda et al. | |
| 2003/0133597 A1 | 7/2003 | Moore et al. | 2004/0190759 A1 | 9/2004 | Caldwell | |
| 2003/0140235 A1 | 7/2003 | Immega et al. | 2004/0193893 A1 | 9/2004 | Braithwaite et al. | |
| 2003/0140928 A1 | 7/2003 | Bui et al. | 2004/0219902 A1 | 11/2004 | Lee et al. | |
| 2003/0141411 A1 | 7/2003 | Pandya et al. | 2004/0233038 A1 | 11/2004 | Beenau et al. | |
| 2003/0149881 A1 | 8/2003 | Patel et al. | 2004/0240711 A1 | 12/2004 | Hamza et al. | |
| 2003/0152251 A1 | 8/2003 | Ike | 2004/0252866 A1 | 12/2004 | Tisse et al. | |
| 2003/0152252 A1 | 8/2003 | Kondo et al. | 2004/0255168 A1 | 12/2004 | Murashita et al. | |
| 2003/0156741 A1 | 8/2003 | Lee et al. | 2005/0008200 A1 | 1/2005 | Azuma et al. | |
| 2003/0158762 A1 | 8/2003 | Wu | 2005/0008201 A1 | 1/2005 | Lee et al. | |
| 2003/0158821 A1 | 8/2003 | Maia | 2005/0029353 A1 | 2/2005 | Isemura et al. | |
| 2003/0159051 A1 | 8/2003 | Hollnagel | 2005/0052566 A1 | 3/2005 | Kato | |
| 2003/0163739 A1 | 8/2003 | Armington et al. | 2005/0055582 A1 | 3/2005 | Bazakos et al. | |
| 2003/0169334 A1 | 9/2003 | Braithwaite et al. | 2005/0063567 A1 | 3/2005 | Saitoh et al. | |
| 2003/0169901 A1 | 9/2003 | Pavlidis et al. | 2005/0084137 A1 | 4/2005 | Kim et al. | |
| 2003/0169907 A1 | 9/2003 | Edwards et al. | 2005/0084179 A1 | 4/2005 | Hanna et al. | |
| 2003/0173408 A1 | 9/2003 | Mosher, Jr. et al. | 2005/0099288 A1 | 5/2005 | Spitz et al. | |
| 2003/0174049 A1 | 9/2003 | Beigel et al. | 2005/0102502 A1 | 5/2005 | Sagen | |
| 2003/0177051 A1 | 9/2003 | Driscoll et al. | 2005/0110610 A1 | 5/2005 | Bazakos et al. | |
| 2003/0182151 A1 | 9/2003 | Taslitz | 2005/0125258 A1 | 6/2005 | Yellin et al. | |
| 2003/0182182 A1 | 9/2003 | Kocher | 2005/0127161 A1 | 6/2005 | Smith et al. | |
| 2003/0191949 A1 | 10/2003 | Odagawa | 2005/0129286 A1 | 6/2005 | Hekimian | |
| 2003/0194112 A1 | 10/2003 | Lee | 2005/0134796 A1 | 6/2005 | Zelvin et al. | |
| 2003/0195935 A1 | 10/2003 | Leeper | 2005/0138385 A1 | 6/2005 | Friedli et al. | |
| 2003/0198368 A1 | 10/2003 | Kee | 2005/0138387 A1 | 6/2005 | Lam et al. | |
| 2003/0200180 A1 | 10/2003 | Phelan, III et al. | 2005/0146640 A1 | 7/2005 | Shibata | |
| 2003/0210139 A1 | 11/2003 | Brooks et al. | 2005/0151620 A1 | 7/2005 | Neumann | |
| 2003/0210802 A1 | 11/2003 | Schuessier | 2005/0152583 A1 | 7/2005 | Kondo et al. | |
| 2003/0218719 A1 | 11/2003 | Abourizk et al. | 2005/0193212 A1 | 9/2005 | Yuhara | |
| 2003/0225711 A1 | 12/2003 | Paping | 2005/0199708 A1 | 9/2005 | Friedman | |
| 2003/0228898 A1 | 12/2003 | Rowe | 2005/0206501 A1 | 9/2005 | Farhat | |
| 2003/0233556 A1 | 12/2003 | Angelo et al. | 2005/0206502 A1 | 9/2005 | Bernitz | |
| 2003/0235326 A1 | 12/2003 | Morikawa et al. | 2005/0207614 A1 | 9/2005 | Schonberg et al. | |
| 2003/0235411 A1 | 12/2003 | Morikawa et al. | 2005/0210267 A1 | 9/2005 | Sugano et al. | |
| 2003/0236120 A1 | 12/2003 | Reece et al. | 2005/0210270 A1 | 9/2005 | Rohatgi et al. | |
| 2004/0001614 A1 | 1/2004 | Russon et al. | 2005/0210271 A1 | 9/2005 | Chou et al. | |
| 2004/0002894 A1 | 1/2004 | Kocher | 2005/0238214 A1 | 10/2005 | Matsuda et al. | |
| 2004/0005078 A1 | 1/2004 | Tillotson | 2005/0240778 A1 | 10/2005 | Saito | |
| 2004/0006553 A1 | 1/2004 | de Vries et al. | 2005/0248725 A1 | 11/2005 | Ikoma et al. | |

| | | | | | | |
|---|---|---|---|---|---|---|
| 2005/0249385 A1 | 11/2005 | Kondo et al. | | JP | 2002153444 | 5/2002 |
| 2005/0255840 A1 | 11/2005 | Markham | | JP | 2002153445 | 5/2002 |
| 2006/0165266 A1 | 7/2006 | Hamza | | JP | 2002260071 | 9/2002 |
| 2006/0274919 A1 | 12/2006 | LoIacono et al. | | JP | 2002271689 | 9/2002 |
| 2007/0036397 A1 | 2/2007 | Hamza | | JP | 2002286650 | 10/2002 |

FOREIGN PATENT DOCUMENTS

| | | | | | |
|---|---|---|---|---|---|
| EP | 0910986 | 4/1999 | JP | 2002312772 | 10/2002 |
| EP | 0962894 | 12/1999 | JP | 2002329204 | 11/2002 |
| EP | 1018297 | 7/2000 | JP | 2003006628 | 1/2003 |
| EP | 1024463 | 8/2000 | JP | 2003036434 | 2/2003 |
| EP | 1028398 | 8/2000 | JP | 2003108720 | 4/2003 |
| EP | 1041506 | 10/2000 | JP | 2003108983 | 4/2003 |
| EP | 1041523 | 10/2000 | JP | 2003132355 | 5/2003 |
| EP | 1126403 | 8/2001 | JP | 2003150942 | 5/2003 |
| EP | 1477925 | 11/2004 | JP | 2003153880 | 5/2003 |
| GB | 2369205 | 5/2002 | JP | 2003242125 | 8/2003 |
| GB | 2371396 | 7/2002 | JP | 2003271565 | 9/2003 |
| GB | 2375913 | 11/2002 | JP | 2003271940 | 9/2003 |
| GB | 2402840 | 12/2004 | JP | 2003308522 | 10/2003 |
| GB | 2411980 | 9/2005 | JP | 2003308523 | 10/2003 |
| JP | 9161135 | 6/1997 | JP | 2003317102 | 11/2003 |
| JP | 9198545 | 7/1997 | JP | 2003331265 | 11/2003 |
| JP | 9201348 | 8/1997 | JP | 2004005167 | 1/2004 |
| JP | 9147233 | 9/1997 | JP | 2004021406 | 1/2004 |
| JP | 9234264 | 9/1997 | JP | 2004030334 | 1/2004 |
| JP | 9305765 | 11/1997 | JP | 2004038305 | 2/2004 |
| JP | 9319927 | 12/1997 | JP | 2004094575 | 3/2004 |
| JP | 10021392 | 1/1998 | JP | 2004152046 | 5/2004 |
| JP | 10040386 | 2/1998 | JP | 2004163356 | 6/2004 |
| JP | 10049728 | 2/1998 | JP | 2004164483 | 6/2004 |
| JP | 10137219 | 5/1998 | JP | 2004171350 | 6/2004 |
| JP | 10137221 | 5/1998 | JP | 2004171602 | 6/2004 |
| JP | 10137222 | 5/1998 | JP | 2004206444 | 7/2004 |
| JP | 10137223 | 5/1998 | JP | 2004220376 | 8/2004 |
| JP | 10248827 | 9/1998 | JP | 2004261515 | 9/2004 |
| JP | 10269183 | 10/1998 | JP | 2004280221 | 10/2004 |
| JP | 11047117 | 2/1999 | JP | 2004280547 | 10/2004 |
| JP | 11089820 | 4/1999 | JP | 2004287621 | 10/2004 |
| JP | 11200684 | 7/1999 | JP | 2004315127 | 11/2004 |
| JP | 11203478 | 7/1999 | JP | 2004318248 | 11/2004 |
| JP | 11213047 | 8/1999 | JP | 2005004524 | 1/2005 |
| JP | 11339037 | 12/1999 | JP | 2005011207 | 1/2005 |
| JP | 2000005149 | 1/2000 | JP | 2005025577 | 1/2005 |
| JP | 2000005150 | 1/2000 | JP | 2005038257 | 2/2005 |
| JP | 2000011163 | 1/2000 | JP | 2005062990 | 3/2005 |
| JP | 2000023946 | 1/2000 | JP | 2005115961 | 4/2005 |
| JP | 2000083930 | 3/2000 | JP | 2005148883 | 6/2005 |
| JP | 2000102510 | 4/2000 | WO | WO 97/17674 | 5/1997 |
| JP | 2000102524 | 4/2000 | WO | WO 98/02083 | 1/1998 |
| JP | 2000105830 | 4/2000 | WO | WO 98/08439 | 3/1998 |
| JP | 2000107156 | 4/2000 | WO | WO 99/32317 | 7/1999 |
| JP | 2000139878 | 5/2000 | WO | WO 99/52422 | 10/1999 |
| JP | 2000155863 | 6/2000 | WO | WO 99/65175 | 12/1999 |
| JP | 2000182050 | 6/2000 | WO | WO 00/28484 | 5/2000 |
| JP | 2000185031 | 7/2000 | WO | WO 00/29986 | 5/2000 |
| JP | 2000194972 | 7/2000 | WO | WO 00/31677 | 6/2000 |
| JP | 2000237167 | 9/2000 | WO | WO 00/36605 | 6/2000 |
| JP | 2000242788 | 9/2000 | WO | WO 01/01329 | 1/2001 |
| JP | 2000259817 | 9/2000 | WO | WO 01/03100 | 1/2001 |
| JP | 2000356059 | 12/2000 | WO | WO 01/28476 | 4/2001 |
| JP | 2000357232 | 12/2000 | WO | WO 01/35348 | 5/2001 |
| JP | 2001005948 | 1/2001 | WO | WO 01/35349 | 5/2001 |
| JP | 2001067399 | 3/2001 | WO | WO 01/40982 | 6/2001 |
| JP | 2001101429 | 4/2001 | WO | WO 01/63994 | 8/2001 |
| JP | 2001167275 | 6/2001 | WO | WO 01/69490 | 9/2001 |
| JP | 2001222661 | 8/2001 | WO | WO 01/86599 | 11/2001 |
| JP | 2001292981 | 10/2001 | WO | WO 02/01451 | 1/2002 |
| JP | 2001297177 | 10/2001 | WO | WO 02/19030 | 3/2002 |
| JP | 2001358987 | 12/2001 | WO | WO 02/35452 | 5/2002 |
| JP | 2002119477 | 4/2002 | WO | WO 02/35480 | 5/2002 |
| JP | 2002133415 | 5/2002 | WO | WO 02/091735 | 11/2002 |
| | | | WO | WO 02/095657 | 11/2002 |
| | | | WO | WO 03/002387 | 1/2003 |
| | | | WO | WO 03/054777 | 7/2003 |

| | | |
|---|---|---|
| WO | WO 03/077077 | 9/2003 |
| WO | WO 2004/029863 | 4/2004 |
| WO | WO 2004/042646 | 5/2004 |
| WO | WO 2004/055737 | 7/2004 |
| WO | WO 2004/089214 | 10/2004 |
| WO | WO 2004/097743 | 11/2004 |
| WO | WO 2005/008567 | 1/2005 |
| WO | WO 2005/013181 | 2/2005 |
| WO | WO 2005/024698 | 3/2005 |
| WO | WO 2005/024708 | 3/2005 |
| WO | WO 2005/024709 | 3/2005 |
| WO | WO 2005/029388 | 3/2005 |
| WO | WO 2005/062235 | 7/2005 |
| WO | WO 2005/069252 | 7/2005 |
| WO | WO 2005/093681 | 10/2005 |
| WO | WO 2005/096962 | 10/2005 |
| WO | WO 2005/098531 | 10/2005 |
| WO | WO 2005/104704 | 11/2005 |
| WO | WO 2005/109344 | 11/2005 |
| WO | WO 2006/023046 | 3/2006 |
| WO | WO 2006/063076 | 6/2006 |

OTHER PUBLICATIONS

Daugman, "Results From 200 Billion Iris Cross-Comparisons," University of Cambridge Computer Laboratory, Technical Report, No. 635, 8 pages, Jun. 2005.
Du et al., "A One-Dimensional Approach for Iris Identification," 11 pages, prior to Jan. 25, 2006.
Huang et al., "Iris Model Based On Local Orientation Description," 5 pages, prior to Jan. 25, 2006.
Huang et al., "An Efficient Iris Recognition System," IEEE, Proceedings of the First International Conference on Machine Learning and Cybernetics, Beijing, pp. 450-454, Nov. 4-5, 2002.
Ma et al., "Personal Identification Based On Iris Texture Analysis," IEEE Transactions on Pattern Analysis and Machine Intelligence, vol. 25, No. 12, pp. 1519-1533, Dec. 2003.
Masek, "Recognition of Human Iris Patterns for Biometric Identification," 61 pages, 2003.
Sun et al., "Robust Encoding of Local Ordinal Measures: A General Framework of Iris Recognition," 13 pages, prior to Jan. 25, 2006.
Camus et al., "Reliable and Fast Eye Finding in Close-up Images," IEEE, pp. 389-394, 2002.
Bonney et al., "Iris Pattern Extraction Using Bit Planes and Standard Deviations," IEEE, pp. 582-586, 2004.
Cui et al., "An Appearance-Based Method for Iris Detection," 6 pages, 2004.
Cui et al., "An Iris Detection Method Based on Structure Information," Advances in Biometric Person Authentication, International Workshop on Biometric Recognition Systems, IWBRS 2005, Beijing China, 10 pages, Oct. 22-23, 2005.
Cui et al., "An Iris Image Synthesis Method Based on PCA and Super-Resolution," IEEE Computer Society, Proceedings of the 17th International Conference on Pattern Recognition, 6 pages, Aug. 23-26, 2004.
Cui et al., "An Iris Recognition Algorithm Using Local Extreme Points," Biometric Authentication, First International Conference, ICBA 2004, Hong Kong, China, 10 pages, Jul. 15-17, 2004.
Avcibas et al., "Steganalysis Using Image Quality Metrics," IEEE Transactions on Image Processing, vol. 12, No. 2, pp. 221-229, Feb. 2003.
Boles, "A Security System Based on Human Iris Identification Using Wavelet Transform," IEEE First International Conference on Knowledge-Based Intelligent Electronic Systems, May 21-23, Adelaide, Australia, pp. 533-541, 1997.
Carson et al., "Blobworld: Image Segmentation Using Expectation-Maximization and Its Application to Image Querying," IEEE Transactions on Pattern Analysis and Machine Intelligence, vol. 24, No. 8, pp. 1026-1038, Aug. 2002.
Daugman, "How Iris Recognition Works," IEEE 2002 International Conference on Image Processing, vol. I of III, 6 pages, Sep. 22-25, 2002.
Guo et al., "A System for Automatic Iris Capturing," Mitsubishi Electric Research Laboratories, Inc., 10 pages, 2005.
Guo, "Face, Expression, and Iris Recognition Using Learning-Based Approaches," 132 pages, 2006.
http://www.newscientisttech.com/article/dn11110-invention-covert-iris-sc, "Invention: Covert Iris Scanner," 3 pages, printed Feb. 8, 2007.
Jalaja et al., "Texture Element Feature Characterizations for CBIR," IEEE, pp. 733-736, 2005.
Kalka et al., "Image Quality Assessment for Iris Biometric," Proc. Of SPIE vol. 6202 62020D, 11 pages, 2006.
Ko et al., "Monitoring and Reporting of Fingerprint Image Quality and Match Accuracy for a Large User Application," IEEE Computer Society, Proceedings of the $33^{rd}$ Applied Imagery Pattern Recognition Workshop, 6 pages, 2004.
Lau et al., "Finding a Small Number of Regions in an Image Using Low-Level Features," Pattern Recognition 35, pp. 2323-2339, 2002.
Maurer et al., "Tracking and Learning Graphs and Pose on Image Sequences of Faces," IEEE Computer Society Press, International Conference on Automatic Face and Gesture Recognition, pp. 176-181, Oct. 14-16, 1996.
Oppenheim et al, "The Importance of Phase in Signals," Proceedings of the IEEE, vol. 69, No. 5, pp. 529-541, 1981.
Ratha et al., "A Real-Time Matching System for Large Fingerprint Databases," IEEE Transactions on Pattern Analysis, and Machine Intelligence, vol. 18, No. 8, pp. 799-812, Aug. 1996.
Sony, "Network Color Camera, SNC-RZ30N (NTSC)," 6 pages, Aug. 2002.
Wang et al, "Image Quality Assessment: From Error Visibility to Structural Similarity," IEEE Transactions on Image Processing, vol. 13, No. 4, pp. 600-612, Apr. 2004.
Wang et al., "A Universal Image Quality Index," IEEE Signal Processing Letters, vol. 9, No. 3, pp. 81-84, Mar. 2002.
Wang et al., "Local Phase Coherence and the Perception of Blur," Advances in Nueral Information Processing Systems 16, pp. 1435-1442, 2004.

* cited by examiner

DISTANCE IRIS RECOGNITION

This application claims the benefit of U.S. Provisional Application No. 60/647,270, filed Jan. 26, 2005. This application is a continuation-in-part of U.S. application Ser. No. 11/043,366, filed Jan. 26, 2005.

U.S. Provisional Application No. 60/647,270, filed Jan. 26, 2005, is hereby incorporated by reference. U.S. application Ser. No. 11/043,366, filed Jan. 26, 2005, is hereby incorporated by reference.

BACKGROUND

The present invention pertains to recognition systems and particularly to biometric recognition systems. More particularly, the invention pertains to iris recognition systems.

SUMMARY

The invention is a system that incorporates certain improvements which support biometrics technology for person recognition from afar.

DESCRIPTION

Figure 1:
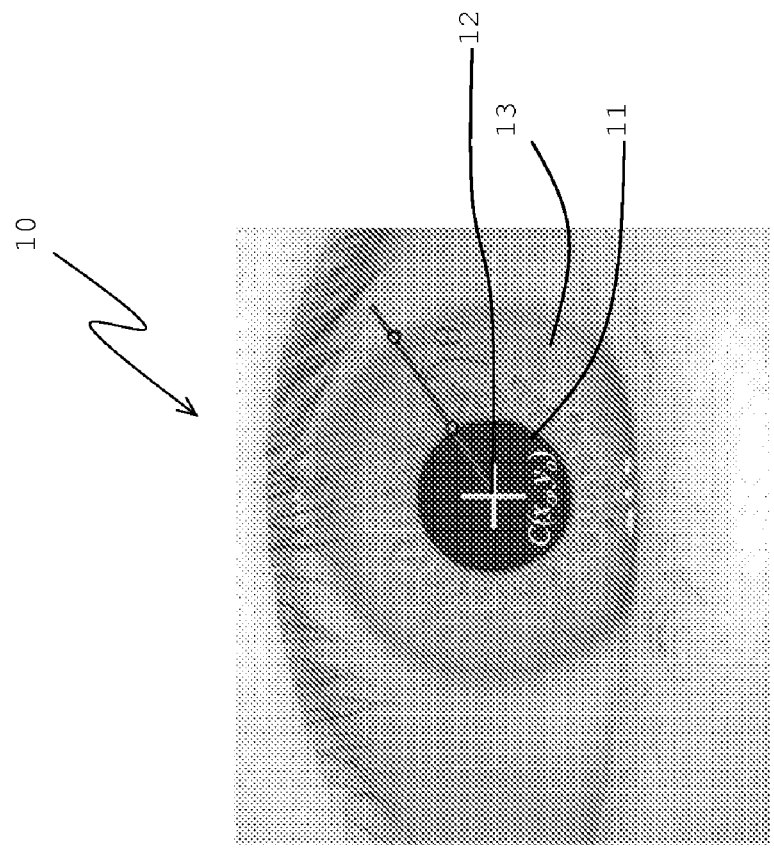
FIG. 1 shows a basis for iris center localization.

The invention may provide people identification and verification, using an "iris-at-a-distance™" or "Iris@aDistance™" (Honeywell International Inc.) system. Iris recognition has been recently recognized and has gained a lot of attention due to its high reliability in identifying humans. Its suitability as an exceptionally accurate biometric derives from its extremely data-rich physical structure, genetic independence (no two eyes are the same even for twins), stability over time, and non-contact means (a feature important for non-cooperative subjects). The present invention may help provide reliable calibration and an efficient segmentation (i.e., localization) of the iris-at-a-distance, resulting in better extraction of the iris features that are eventually converted into a numeric code. The iris codes may be compared with previously generated iris codes for verification and/or identification purposes.

As stated above, iris features are a reliable/accurate biometric measure. However, from a technical point of view, this accuracy lies heavily on how best the iris and pupil are segmented and extracted. When analyzing iris images of cooperative subjects, the segmentation approach is a relatively straightforward process of edge detection and circular fitting. However, this is often not the case for iris-at-a-distance systems, which often do not enjoy the cooperation of the subject. For most cases in an iris-at-a-distance system, only a portion of the iris is captured due to, for example, closure effect and/or eyelash and eyelid occlusions. Furthermore, given that the subject is typically not asked to cooperate, a tilted head or a rotated iris typically must also be considered. The present invention addresses these challenges, and in some cases, extracts accurate segments of the iris borders, among other things, in an iris-at-a-distance environment.

In one illustrative example, the process may include: 1) using a POSE™ (i.e., polar segmentation) technique to move virtually immediately the analysis to a polar domain and execute a 1-D segmentation of the iris borders; 2) using one or more symmetry properties to detect one or more non-occluded areas of the iris—non-symmetric regions can correspond to areas partially covered by eyelashes, eyelids, and so forth (thus asymmetric)—and, in some cases, can limit the analysis to only those reliable segments where the iris and the sclera are detected (as noted in this description relative to symmetry); 3) once orientation is detected, identifying the nominal angles with the least likelihood of distortions (i.e., occluded or deformed due to orientation) by, for example, estimating the ellipse parameters from nominal angles, and computing a calibration factor; 4) using a rotated ellipse detection technique that uses overlapping variable circles to detect the iris borders modeled as elliptic or irregular shapes rather than circles, and/or using a least square fitting to estimate the elliptic parameters and orientation; and 5) using mixture modeling to handle variation in the iris textures. The sclera is the tough white fibrous outer envelope of tissue covering the entire eyeball except the cornea.

The present invention is well suited for high-security access control or "at-a-distance biometrics" applications where less control is exercised on subject positioning and/or orientations. Such operations may include, for example, subjects captured at variant ranges from the acquisition device, and/or may not have the subjects eye(s) directly aligned with the imaging equipment. Usually, for such applications, it is difficult to implement the level of control required by most of the existing art to enable reliable iris recognition. The present invention may help cope with asymmetry in acquired iris images, and may further help under uncontrolled environments as long as some of the iris annular is visible.

A leading concern in the development of biometric systems is how to avoid rejecting valid subjects or validating imposters. The iris recognition may provide a reliable solution by offering a much more discriminating biometric than other types of biometrics including face and fingerprint recognition techniques.

The following desirable properties make iris recognition technology as a potential reliable personal identification tool. For instance, this technology may have the following noted characteristics. First, it may have uniqueness and genetic independence. Eyes have an extraordinary structure that is unique to each human being. Unlike other well known biometric technologies, such as face-prints, fingerprints, irises are unique to a person and even among genetically twin individuals. Although the striking visual similarity of identical twins reveals the genetic penetrance of facial appearance, a comparison of genetically identical irises reveals just the opposite for iris patterns. The biomedical literature suggests that iris features are as distinct for each human as fingerprints or patterns of retinal blood vessels. Second, it has an extremely data-rich physical structure. There may be sufficient texture to make adequate discrimination between subjects. Third, there is no aging effect, that is, there is stability over life of the iris features. Fourth, it has non-invasiveness. The iris is considered an internal and unique organ, yet is externally visible and can be measured at a distance.

All these properties make iris recognition suitable for highly reliable personal identification then other notable biometrics such as facial recognition. It has been demonstrated that, unlike facial recognition, the phase structure and local features extracted from irises is purely epigenetic, so performance of iris recognition is not limited with application to identical twins or by the existence of partial genetic relationships.

Conversion of an iris annular image into a numeric code that can be easily manipulated may be essential to iris recognition. Computing iris features may use a good-quality segmentation process that focuses on the subject's iris and properly extracts its borders.

In support of an iris-at-a-distance application, one may use POSE™ (Honeywell International Inc.) and a 1-D Polar based "segmentation approach". POSE differs from the usual state-of-the art techniques in that it may conduct a one-dimensional segmentation process in the polar domain, replace the exhaustive search for geometric models (such as circles) and avoid the use of costly edge detections and curve fitting by simply executing a straightforward peak search on 1D signatures. The present approach may map immediately into the polar domain right from the start. To retrieve the iris annular region from the image, POSE may map the analysis at an earlier stage then previously done into the polar domain. By conducting the segmentation in polar domain, this may lead to a more efficient and faster process to execute not only the segmentation, but also calibration, and noise removal, all in one single step to generate a feature map for the encoding step.

In this framework, one may introduce a feature extraction technique in support of POSE to reduce the side effects of eye occlusions, eye closures, and deformation in captured iris images due to tilted heads and orientation perspectives projected in the image plane. The technique may be suited for the iris-at-a-distance applications, i.e., in cases where subjects are unaware that they are under surveillance, or in a crowded area, or even in cases where subject is aware of iris control but are non-cooperative. Such operations may include subjects captured at variant ranges from the acquisition device or may not have their eye directly aligned with the imaging equipment.

Here may be a designed and implemented an iris-at-a-distance biometric system specifically for these kinds of applications, which could function as an extremely reliable tool for people recognition and identification. Further, the present system may solve the asymmetry problem associated with image acquisition without the collaboration of the subjects and that it can operate under uncontrolled operations as long as some of the iris annular is visible.

Several issues may be researched further when developing an iris recognition solution. Relative to calibration issues, the iris inner and outer boundaries of iris may be approximated by ellipses than circles of irregular shapes using snake delineation. However, the two ellipses are usually not concentric. One may characterize the shape and texture of the structure of the iris having a large number of interlacing blocks such as freckles, coronas, furrows, crypts, and stripes.

A change in the camera-to-eye distance may result in variations in the size of the same iris. Preprocessing to reduce the side effects of non-uniform lighting or illumination reflections may be needed before one executes feature extractions procedures. Specular (mirror-like) reflections and the treatment of soft specular reflected dots may affect the segmentation analysis.

The outer boundaries of the iris may be captured with irregular edges due to presence of eyelids and eyelashes. Taken in tandem, these observations suggest that iris localization may be sensitive to a wide range of edge contrasts.

The orientation of head and eyes may result into different perspective of views of the iris circular shape. The captured shapes of the iris are usually far from circles or ellipses due to the orientation, tilt and slant angles.

Fundamental approaches to iris imaging matching may be built around Iridian (i.e., pertaining to an iris) solutions which inherit Daugman's algorithms for iris recognition. The Iridian technology algorithms may limit the extensibility of the iris recognition into real-time non-controlled environment. While certain operations are consistent with the preconditions, it is difficult to implement these existing technologies without the level of control required by the algorithms.

To extend to at-a-distance applications, some of the algorithm procedures that may require exhaustive processes which include Hough transforms. Some issues with a Hough method may include requiring threshold values to be chosen for edge detection, which may result into critical information (e.g., edge points) being removed/missed, and thus resulting into failure to detect the iris or pupil regions. The Haugh transform is computationally intensive due to its brute-force approach, and then may not be suitable for real-time applications. Furthermore, the method may fail where the image is subject to local noise in the eye image since it works on local spatial features.

A Daugman integro-differential operator may be seen as a variation of Haugh transform, since it appears to make use of derivatives of the image and perform a search to find geometric information that determines spatial parameters identifying the circles of the iris and pupil. The advantage the Daugman operator has over Haugh may be that it does not require threshold values as it is based on raw derivatives. However, it may fail when the image suffers from local spatial noise (e.g., specular reflections along the eye image, speckles due to digitization, and so forth).

As to eyelid occlusion and masking, one approach in dealing with the eyelid occlusions masks portions of the image may use linear fitting. However, the eyelid boundaries may be irregular due to the presence of eyelashes as well. Another approach in dealing with variable occlusions may be modeling the eyelids with parabolic curvatures and using the extracted configuration of model components to fine tune the image intensity derivative information. The alternative may cost a lot of computation given that is based on edge detection and non-linear curve fitting.

Another iris recognition technique may be based on a 1D process; but it is mostly tailored to improve the encoding scheme for better representation of the iris features rather than simplifying the segmentation process. Unlike the present approach which formulates the segmentation problem into a 1D framework, some methods construct a set of 1D intensity signals decomposed from the 2D constructed iris map. Gaussian moments applied on 1D representation of feature vectors may have been advocated by some as the best representation of local features that indirectly quantify the variations in textures due to coronas, stripes, furrows, and so forth. Such technique may still be based on 2D segmentation process to construct a 2D normalized polar map of the iris. It then may decompose the 2D map into a set of 1D intensity signals by simply averaging some segments of the rows of the map. Although, this effort may complement the present finding by executing the entire iris segmentation and encoding in a 1D domain. A 2D encoding scheme may appear to be much more reliable than a 1D process because of the inherited two dimensional relational spatial features in a 2D encoded signature.

A new 1D encoding scheme that may generate a 1D iris signature includes translation, rotation, illumination, and scale invariant. The merit of this method is that may allow users to enroll at lower level of iris image quality. This implies that the technique may not be as reliable as the 2D encoding scheme. However, that technique may support the concept of having a search mode before passing the limited potential subjects to a 2D encoding for final identifications. Once again, the present approach may implement a complete 1D segmentation and encoding iris technique.

Iris segmentation may be a factor to note. The first stage of iris recognition may be to isolate the actual iris region in a digital image of the eye. Often, for others, the iris region may be approximated by geometric models, i.e., two circles, to simplify the image processing segmentation of the iris and pupil.

Many others may make use of first derivatives of image intensity to signal the location of edges to segment the borders of these geometric models representing the boundaries of the iris. Unfortunately, most of existing algorithms may yield costly procedures for geometric model searches throughout the digital image.

Normalization may be a crucial step of the overall analysis given that that the eye image goes through various deformations. The intent may be to scale the extracted iris region cropped from the image to allow for a fair comparison with the database templates.

The dimensional inconsistencies among the captured iris images may be primarily due to many reasons such as a stretching of the iris caused by the pupil dilation from varying levels of illumination and lighting.

As to image range, the varying distance of image capture and imager orientation may be due to camera or head tilting and slanting. There may be local rotation of the eye within the eye socket. The subject or the subject's face might not be directly aligned with the acquisition device.

Image enhancement may be applied to minimize illumination artifacts, i.e., non-uniform brightness that illuminates areas more than others within the iris annular region. Reducing the illumination artifacts may improve subsequent encoding and feature extraction steps. The perspective orientation may be addressed before conducting feature extraction; however, this could add more computational burden on the system. The present segmentation algorithm does not appear to require these preprocessing steps to extract accurate features of the iris.

Encoding may be noted. In order to provide accurate recognition or identification of individual irises, one may need to extract the most discriminating information present in the polar presentation of the extracted iris. Just the significant features of the iris patterns may need to be encoded so that comparisons between two subjects can be made easy. The encoding scheme may be to generate a simpler template of a few bits that captures the essence of iris patterns. The extracted numeric code may then be used to compare it to multiple stored codes. Encoding the iris signature may include applying an encoding algorithm such as wavelet or Gabor filters or other techniques as listed below to extract textural information from images, such as the detailed patterns of the iris to produce a bitwise template containing a number of bits of information and excluding some of the corrupt areas using masking within the iris pattern. The choice of the encoding filters may be made on the basis of achieving the best recognition rate and preserving the iris patterns in the limited generated bitwise template.

In one's encoding process, regardless of the kind of filter chosen, one may generate more quantized phasor information represented by more than just two bits and prioritized with the most significant bits over the least significant bits when conducting matching. The merit of this scheme is that it may provide a quick way of matching subjects and also provide way to generate the most probable match instead of the best match when facing with poor quality iris images and iris patterns. For instance, one may conduct average weighting on the numeric code when conducting matching using any of the information divergence measure.

Encoding may include the actual encoding of the extracted features having different means of filtering and processing. The encoding mechanism may involve applying one or more selected filters to the segmented iris image(s). Some of the filters used by the state-of-the art techniques may include but are not limited to the following, such as wavelet/bank filters which may be also known as part of a multi-resolution technique. The wavelet approach may have an advantage over traditional Fourier transform in that the frequency data is localized. Gabor filters may also be capable of presenting a conjoint representation of the iris pattern in a spacial and frequency domain. Log Gabor filtering may be more reliable than Gabor filtering. Haar filters have been shown to possibly outperform Gabor filters. Laplacian filters may involve pyramid based decomposition to obtain a simplified version of the signal.

There may be matching which can be conducted using information theory measures, with a metric of the hamming distance. This process may execute matching between a query and encoded signatures. Several types of information measures, including but not limited to, may include a hamming code, a Euclidian code, a Jeffery code, a Kullback code, or any other standard information divergence measure which can be used to provide the weighted distance. The average weighted measure may be emphasized in the present approach. More weight may be distributed on the most significant bits versus lower bits. As a result, a phasor value may be represented by 8 or 16 segments (2^N) rather than just 2 bits in other codes. The weights may be distributed based upon the significance of the bit position.

POSE may perform iris recognition under suboptimal image acquisition conditions. The technique may be used for iris segmentation to detect all boundaries (inner, outer, eyelid and sclera and horizon) of the image iris. This technique may be well suited for high-security access control or iris-at-a-distance applications with less control exercised on subject positioning or orientations. Such operations may include subjects captured at variant ranges from the acquisition device or may not have their eye directly aligned with the imaging equipment. Usually, for such applications, it may be difficult to implement the level of controls required by much of the existing art to enable reliable iris recognition operations. The present approach of iris recognition may cope with asymmetry in acquired iris imaging and it may operate under any uncontrolled operations as long as some of the iris annular is visible.

There may be center pre-estimation. In the following analysis one does not approximate the iris boundaries as circles or ellipses which may take any other irregular shapes. The analysis still holds for any other deviated shapes due to distortions. One may localize the iris using a present simpler method and more general than done otherwise in the related art.

Assume that $\rho(x,y)$ is a continuous density function on the blob region R as a function of the intensity function of the image. Then the center of mass may be defined by the following equation, $$C(\hat{x}_o, \hat{y}_o) = \left(\frac{m_x}{M}, \frac{m_y}{M}\right),$$

where M is the mass within the blob, and the moments of mass on both axes are, $$m_x = \int\int_R \rho(x, y) y \, dx \, dy; \ \& \ m_y = \int\int_R \rho(x, y) x \, dx \, dy; \quad (1)$$

Measurement of the center of the inner boundary may be of interest. The segmentation analysis does not necessarily rely on exact measurements of centers of both boundaries. Additional steps to extract the exact center of the inner iris ellipse may be noted.

Iris center localization may be shown in FIG. 1. The blob analysis likely will not necessarily lead to an accurate center of the pupil 11. Hence, further processing may be required to come up with a more accurate measure to locate the pupil center. There may be a center 14, $C(\hat{x}_o, \hat{y}_o)$. Assuming that the pre-estimated center 12, $C(x_o, y_o)$, is within the pupil 11 circle, then one may show easily that the actual center of the pupil is given by $$r(\theta) = \text{Radius w.r.t.} C(\hat{x}_o, \hat{y}_o) \quad (2)$$

Thus, $x_o = \hat{x}_o + \Delta r(\theta_o)\cos(\theta_o)$ and $y_o = \hat{y}_o + \Delta r(\theta_o)\sin(\theta_o)$ where, $\Delta r(\theta_o) = \arg\max_\theta\left(\frac{r(\theta) - r(\theta + \pi)}{2}\right)$ In particular, if one has non-deformed iris 13 shape (i.e., virtually perfect circles), the equations above may be simplified to the following:

$$x_o = \frac{(r_0(x, 0) + r_\pi(x, 0))}{2} \quad y_o = \frac{(r_{-\pi/2}(0, y) + r_{\pi/2}(0, y))}{2}$$

The segmentation process may include the 1D POSE technique, although other approaches may be used. To simplify the segmentation process, one may propose mapping the analysis at an early stage to polar domain to execute the segmentation using 1D analysis procedure. In addition, the analysis may be conducted only on a subsection of the image surrounding the iris 13. In many other techniques, extraction of polar representation occurs near the end of the analysis.

A rapid polar conversion from an approximate center may permit a fast 1D segmentation in polar domain. The POlar SEgmentation (POSE) may yield rapid extraction of the apparent pupil and iris boundaries using one dimension signal processing. The analysis may detect all kind of boundaries; including non-elliptic boundaries (i.e., geometrically and biologically distorted images). The approach may handle line-of-sight boundaries at the far side of a significantly rotated head, eye, and/or iris.

Detection of a starting point within the pupil may be sufficient to initiate the mapping to a polar domain. Further adjustment of the pupil center may be considered as part of the POSE technique in the polar domain. The central point estimate may be based on any blob analysis, thresholding (presuming that the pupil resides at the darkest contrast of the eye image), or other approaches. Unlike known related art, the pupil center may be used as a basis of the analysis. The iris region may be normalized further to be centric/centered with respect to the same pupil center.

One may start the process by a rapid computation of a pupil-centered polar representation of the region-of-interest (ROI) surrounding the iris 13. The ROI may be mapped to the polar domain with respect to the estimated pupil center 12, $C(x_o,y_o)$:

$$I_R(x, y) \xrightarrow{C(x_o, y_o)} I_R(\theta, r)$$

Based upon the predefined/estimated center, one may proceed by estimating an approximate iris 13 width. Then one may use the predefined center and iris width to execute the mapping immediately before any actual segmentation is executed.

Figure 2:
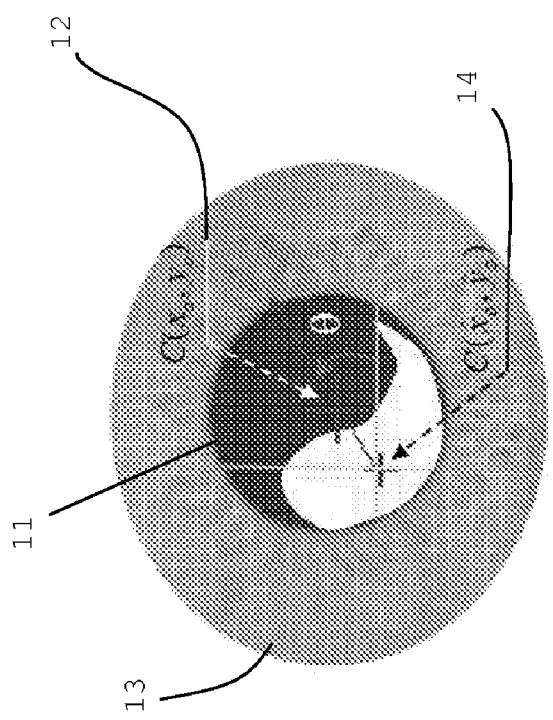
FIG. 2 shows iris references for image polar mapping.

FIG. 2 shows the referenced parameters that are used to map the image domain to the polar domain, that is, the Figure shows iris references for image polar mapping One may then construct a 1D function in the polar domain, which then may be convolved to locate the boundaries of the pupil 11 and the iris 13 of an eye 10. The analytical 1D function may be defined at each angle as a function of the radius variable, r:

$$f_\theta(r) = \int\int_{\Delta r, \Delta \theta} I_R(\theta, r) d\theta \, dr \quad (3.a)$$

The estimated location of the iris 13 with respect to the center 12, $C(x_o, y_o)$ may be computed as follows:

$$r_{iris}, r_{pupil} = \max_{r_k}\{f_\theta(r) \otimes u(r)\} \quad (3.b)$$

where u(r) may be a step function used to detect the contrast changes in the function f( ).

Figure 3:
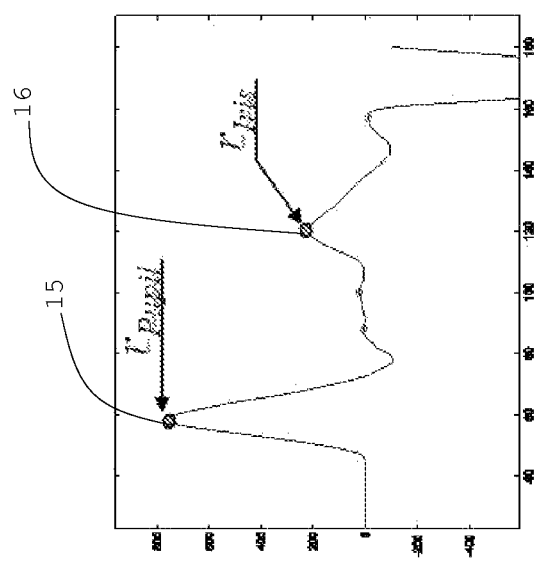
FIG. 3 shows one dimensional polar segmentation.

FIG. 3 shows 1D polar segmentation. The present approach may be further simplified to 1D match filter to detect the exact edges of boundaries of the iris 13. The segmentation may then be conducted at all desired predefined angles. The peaks 15 and 16 from left to right represent the radii of the pupil 11 and the iris 13, respectively.

Figure 4:
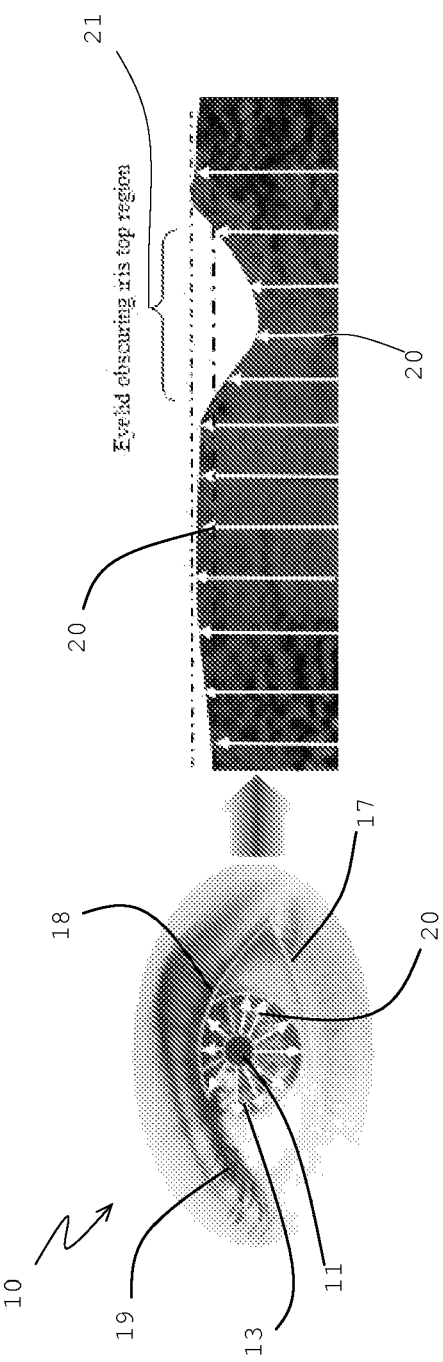
FIG. 4 shows image segmentation omitting normalization for illustrative purposes.

FIG. 4 shows image segmentation omitting normalization for illustrative purposes (note that normalization is normally conducted on 1D signals extracted during the segmentation process). As shown in this Figure, eyelids 17 and 18, and/or eyelashes 19 may obscure some of the iris 13 annular region. Related art techniques may treat these obscurations as noise and tend to isolate the obscured region by first detecting the edges of the eyelids/eyelashes by fitting multiple linear/non-linear curvatures/lines to the upper and lower eyelids using, for example, a Hough transformation, in many cases, thus adding more computational burden to already complicated procedures. Other alternative techniques make use of the Gabor filters and thresholding on a variance of intensities and connectivity criterion so that estimated curvatures lead to connected points of eyelash representation. Unlike these techniques, the present isolation of affected areas of the iris 13 may be done by comparing the expected radius segment 20 (median value of estimated segments 20, the expected length may be limited to only measurements taken at the nominal angles with least likelihood of distortions or noise) with the measured width. If there is a significant reduction in measured width, then the data may be treated as noisy and treated separately.

Figure 5:
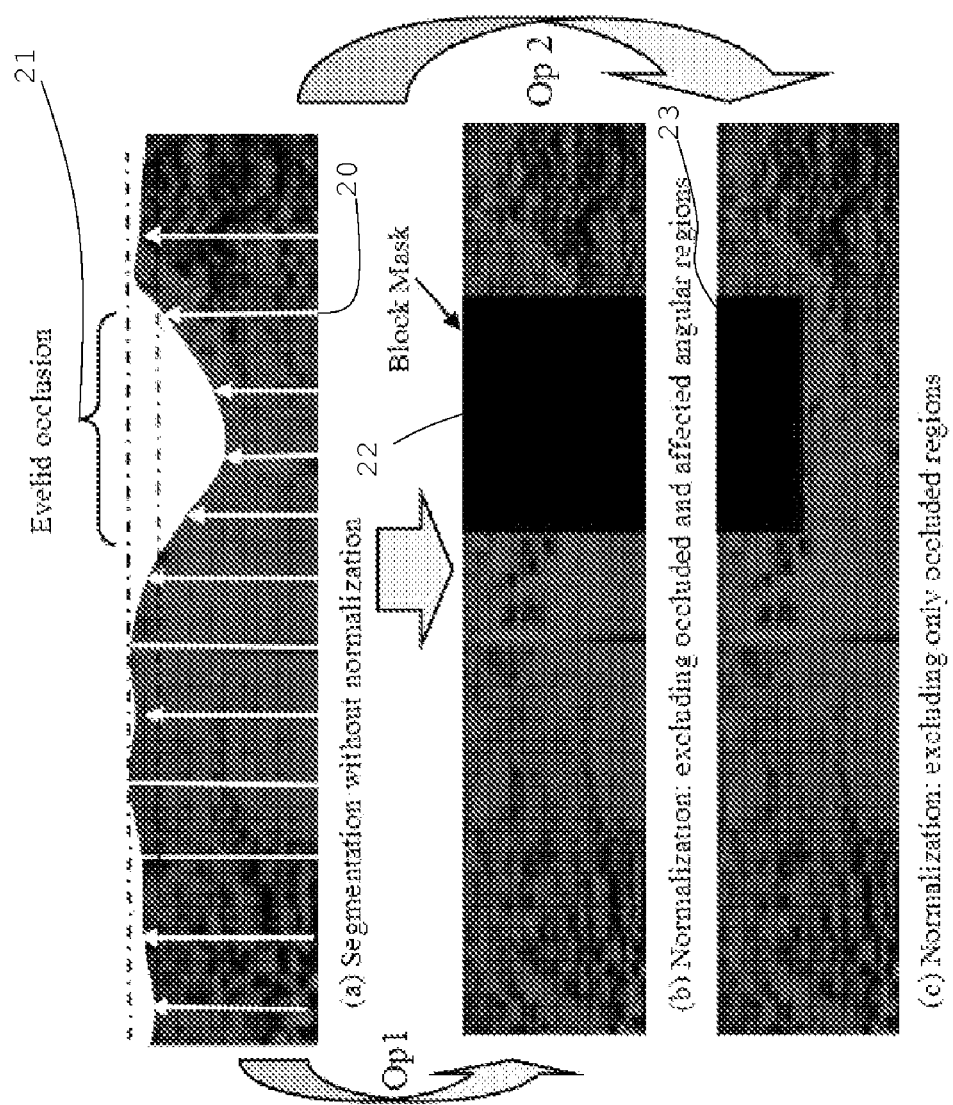
FIG. 5 shows normalization and treating eyelid occlusions.

FIG. 5 shows normalization and treating eyelid 17, 18 occlusions 21. There may be two present alternatives that may handle the eyelid occlusions 21. First, one may mask all the corresponding pixels 22 at the affected angles. Although, this approach is simpler than the following approach, it tends to exclude some pixels that may end up being crucial for discriminations. Second, one may mask only the affected region 23 of the iris 13. The region captured in FIG. 4, under the eyelid-occluding the top portion 21, may be accounted for by normalizing the region based on the expected width value (i.e., median value of the measurements). Thus, just the pixels 23 that correspond to the iris 13 occluded underneath the eyelid 18 are masked out, as shown in FIG. 5.

Iris 13 normalization may be noted. For the purpose of achieving more accurate recognition results, it may be necessary to correct for the shape deformation and bring uniformity into the shape of the iris 13 before passing the polar data into the encoding scheme. Typical techniques conduct normalization towards the end. With the present technique, normalization may be conducted during the segmentation process.

It is expected that at least four major artifacts may result into deformation of the iris 13 circular shape, thus making a normalization scheme necessary while mapping the iris pixels into the rubber polar presentation. First, there may be range differences. Irises of different people may be captured at different ranges of the camera even under constrained conditions. Second, there may be iris dilation. It may be natural to expect that the size of iris change because of illumination changes. Usually, this type of change may be uniform across the annular iris shape. Third, there may be a natural iris deformation. There may be cases where the iris is asymmetric by nature. Pupil 11 region is not necessarily concentric within iris 13 region, and may be slightly nasal. Although, this may be used as an additional discriminating feature for individuals, one may bring all textures into a single referenced shape for simplicity. The present normalization scheme may be able to preserve the discriminating features of deformed iris 13 into the new presentation. Fourth, there may be perspective orientations which may include any line-of-sight boundaries at the far side of a significantly rotated head, eye 10, and/or iris 13.

Unlike the related art, the present normalization process may be conducted as the iris 13 segment is extracted from POSE technique. For instance, let $$S_\theta(r) = \int_{\Delta\theta} I_R(\theta, r)\, d\theta \qquad (4.a)$$

be the 1D representation of the polar map at angle $\Theta$; for simplicity, one may assume that uniform integration is used along the $\Theta$ axis. Then, the normalized signal may be based on the interpolation/decimation of the signal. The normalized output is stated as follows:

$$P_\theta(r) = ^L\!\!\uparrow [^h\!\!\downarrow S_\theta(r)] \qquad (4.b)$$

Figures 6, 7A, 7B:
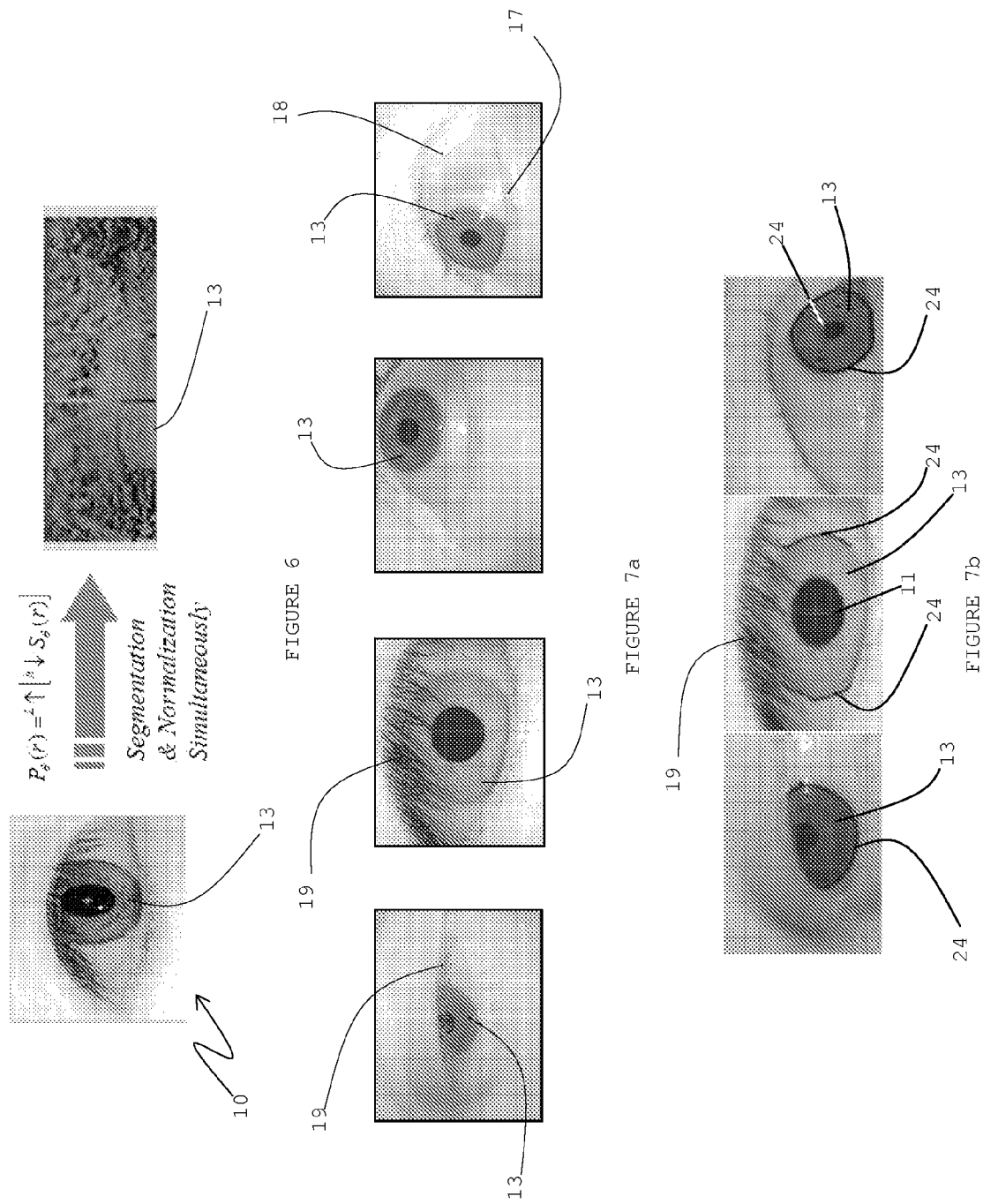
FIG. 6 shows segmentation and normalization conducted simultaneously.
FIG. 7*a* shows examples of side effects of closures, eyelashes, and slanted oriented irises.
FIG. 7*b* shows examples of the results of an enhanced feature extraction.

L may be the desired dimension (i.e., number of rows) for the polar representation of the iris 13 texture. The variable h may vary based upon the deformation type and amount of degradations. FIG. 6 shows segmentation and normalization of the iris 13 conducted simultaneously. A feature extraction technique may be noted.

The present approach addresses a number of challenges and may makes headway towards the commercialization of a reliable iris system without any constrains on the subject of interest. Interest may be in particular interest in recognizing/identifying subjects in large open spaces like airport gates, plazas, potentially crossroads, and sensitive checkpoints. These applications may constitute iris-at-a-distance with no constrains imposed in image acquisitions, and which may be referred to hereon as "iris-at-a-distance" (IAD).

A comprehensive iris-at-a-distance system may depend primarily on two different technologies—optical design and a computer vision solution. The computer vision solution may be stressed in this section.

The present system may be the only one that features a reliable segmentation stage for irregular acquired iris 13 images. The practical aspects of fielding an iris-at-a-distance system may be noted. There are a number of requirements that a surveillance system may need to fulfill to function properly and be commercially viable. The occlusion issues of eyelashes 19 and eyelids 17, 18 may be some of the challenges. The POSE segmentation technique may be used to solve some of the challenges. POSE may have been proven to be a more reliable mechanism than such things as spatial thresholding or Hough space based techniques.

Spatial thresholding may do a questionable job of classifying all the relevant iris pixels of the eye image. Edge detection and Hough transform may require an intensive computational load to execute all necessary steps to extract the iris 13 segmentation. In addition, fitting the iris into predefined shapes such as circles, ellipses or predefined curves (representing eyelashes) may be closest to reality only under constrained conditions where the subject iris is placed through guidelines to picture a perfect perspective of the iris 13. This scenario appears to be far from real in the iris-at-a-distance approach.

For the iris-at-a-distance, it may be challenging to implement the level of controls required by much of the related art to enable reliable iris recognition operations. Three major challenges arise when dealing with such application to uncontrolled operations are closure of the captured eye 10, eyelash 19 and eyelid 17, 18 occlusions 21, and artifacts due to subjects not having their eye directly aligned with the imaging equipment. As shown in FIG. 7, the effects of eyelashes 19 or eye-closure or any line-of-sight boundaries at the far side of significantly rotated head, eye 10, or iris 13 may result in some deformation due to orientation perspectives.

FIG. 7a shows an example of side effects of closures, eyelashes 19, and slanted oriented irises 13. Many of the related art algorithms fail when faced with closure, occlusions, and deformation in image acquisition.

The present system may use a feature extraction technique based on the POSE segmentation approach to handle such scenarios. The present approach may cope well with asymmetry in acquired images and it may operate under uncontrolled operations. FIG. 7b shows the outcome of the present approach with enhanced feature extraction 24 results.

Perspective plane transformation may be noted. A present preprocessing approach may be based upon perspective plane orientation that addresses some of the deformations in image acquisitions. Such operations may include subjects captured at variant angles from the acquisition device or the subjects may have their eye 10 or iris 13 not directly looking into the imaging equipment.

The present preprocessing approach for estimating the orientation in space of the face surface from an imaging angle may be based upon the fact that some of these orientation angles are provided by the face recognition tool. One may derive an accurate model of the captured image and its respective projection in the imaging plane. The perspective projection may have a dominant and fundamental role in the present preprocessing operations to detect iris 13 positions with respect to the face, and not with respect to the imaging plane. Segmentation of the iris 13 may be considerably simplified if the effects of the perspective projections are eliminated. The POSE technique may be easily applied once on the recovered face image with aligned perspective. The orientation estimation may be essential if the camera is situated at an angle of the normal axis of the eye gaze. For instance, the segmentation and feature extraction 24 procedures may be considerably simplified if the effects of the perspective projection are eliminated first, thus reducing the asymmetry in the captured frames and producing accurate segmentations.

Figure 8:
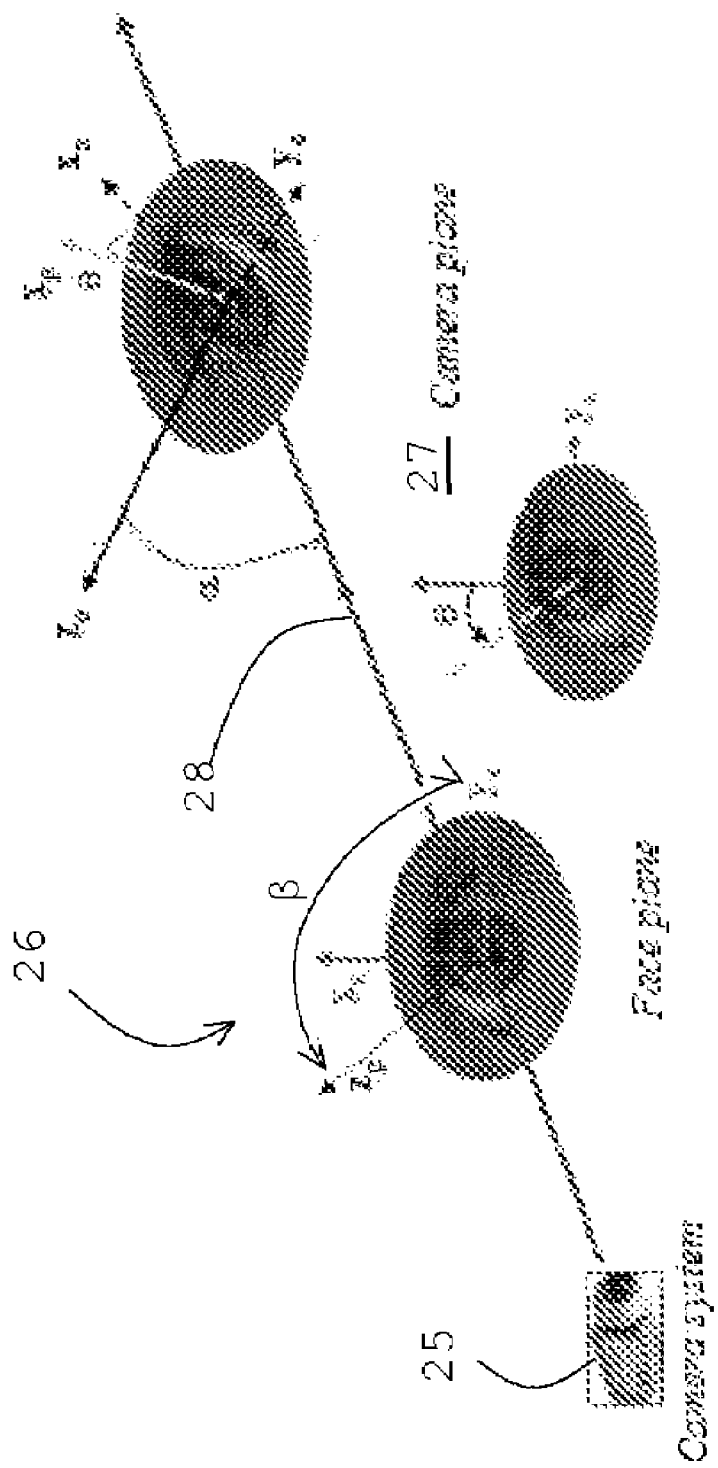
FIG. 8 shows a perspective plane orientation in image acquisitions.

FIG. 8 shows a perspective plane orientation in image acquisitions. To solve the perspective transformation, the analysis may involve a high-order partial-differential equation. In the following, one may assume a pinhole perspective projection model to provide an estimate of the geometric view of the actual face from the camera 25 perspective. One may assign a camera plane or imaging plane 27 coordinate system, $\vec{x}_c = (x_c, y_c)$ (imaging plane coordinates) and the actual face plane 26 coordinate $\vec{x}_o = (x_o, y_o)$. One may use the elevation angle of the face normal for representing the orientation of the face. The elevation angle, $\alpha$, may be the angle between the face normal and the camera system axis 28. One may use the tilt angle, $\beta$, to denote the angle between x-axis and the projection of the face normal onto the imaging plane 27. One may denote $\theta$ to be the angle between the upper eyelid 18 center and the back projection of the image tilt vector (cos $\beta$, sin $\beta$) on the face plane 26. The tilt vector may be associated with the elevation angle and indicate how much the surface of the face is tilted from the perspective of the imaging plane 27. Thus, the coordinate transformation from the actual face to the imaging plane 27 may be given by $$\vec{x}_c = R_\beta T_\alpha R_\theta \vec{x}_o \quad (1)$$

where $R_\beta = \begin{bmatrix} \cos\beta & -\sin\beta \\ \sin\beta & \cos\beta \end{bmatrix}$;

$T_\alpha = \begin{bmatrix} \cos\alpha & 0 \\ 0 & 1 \end{bmatrix}$;

and $R_\theta = \begin{bmatrix} \cos\theta & -\sin\theta \\ \sin\theta & \cos\theta \end{bmatrix}$.

To extract the actual coordinates of a point P(x,y) captured in the imaging plane 27, one may express the original coordinates as an inverse transformation of a point on the image plane to a point on the face surface plane 26 due to the perspective back projection.

One may use an enhanced feature extraction 24 approach. The purpose of this effort may be to explore that which will enhance current capabilities of the POSE technique in iris 13 recognition as applied to more unconstrained iris capture in more diverse environments where occlusions 21 and irregularities are expected. The present approach may operate under any of these uncontrolled operations as long as some of the iris 13 annular is visible in the acquired image. An overall view of the present approach is shown in FIG. 9.

The approach may be initiated by a step 31 segmenting the iris 13 region using the POSE technique; then one may do a step 32 to classify the iris regions into unaffected versus affected regions. In a step 33, one may process the unaffected regions to fit regular or irregular, i.e., elliptic, iris shapes. This may involve an elliptic fitting step 38 for normalization. The present curvature fitting approach may be general enough to cover virtually all possible cases for irregular shapes using snake delineation via POSE. In a step 34, one may then process the affected regions to cover any possible regions that can be calibrated using the parameters of the extracted shape, i.e., calibration step 37 to reduce occlusion effects. In a step 35, one may cluster out the areas where iris 13 is completely covered with eyelashes 18 or eyelids 17 and 18 using the mixture modeling technique step 36. There may be inputs from steps 36, 37 and 38 for an encoding step 39, where the map of the iris 13 may be converted into a numeric bitwise code.

The first stage of iris recognition is to isolate the actual iris region in a digital eye image. The POSE technique may be successfully applied to extract the iris region with least computation possible, i.e., a 1D based analysis. The success of the present POSE segmentation may depend on the imaging quality of eye images. For instance, one may presume that images are passed through preprocessing stages to eliminate artifacts due to specula reflections or any other types of background noise. In addition, POSE may localize the analysis around the pupil center and immediately map it to the polar domain, without a need to adjust for non-concentric to the iris center which is a process that may be required by the related art.

Figure 9:
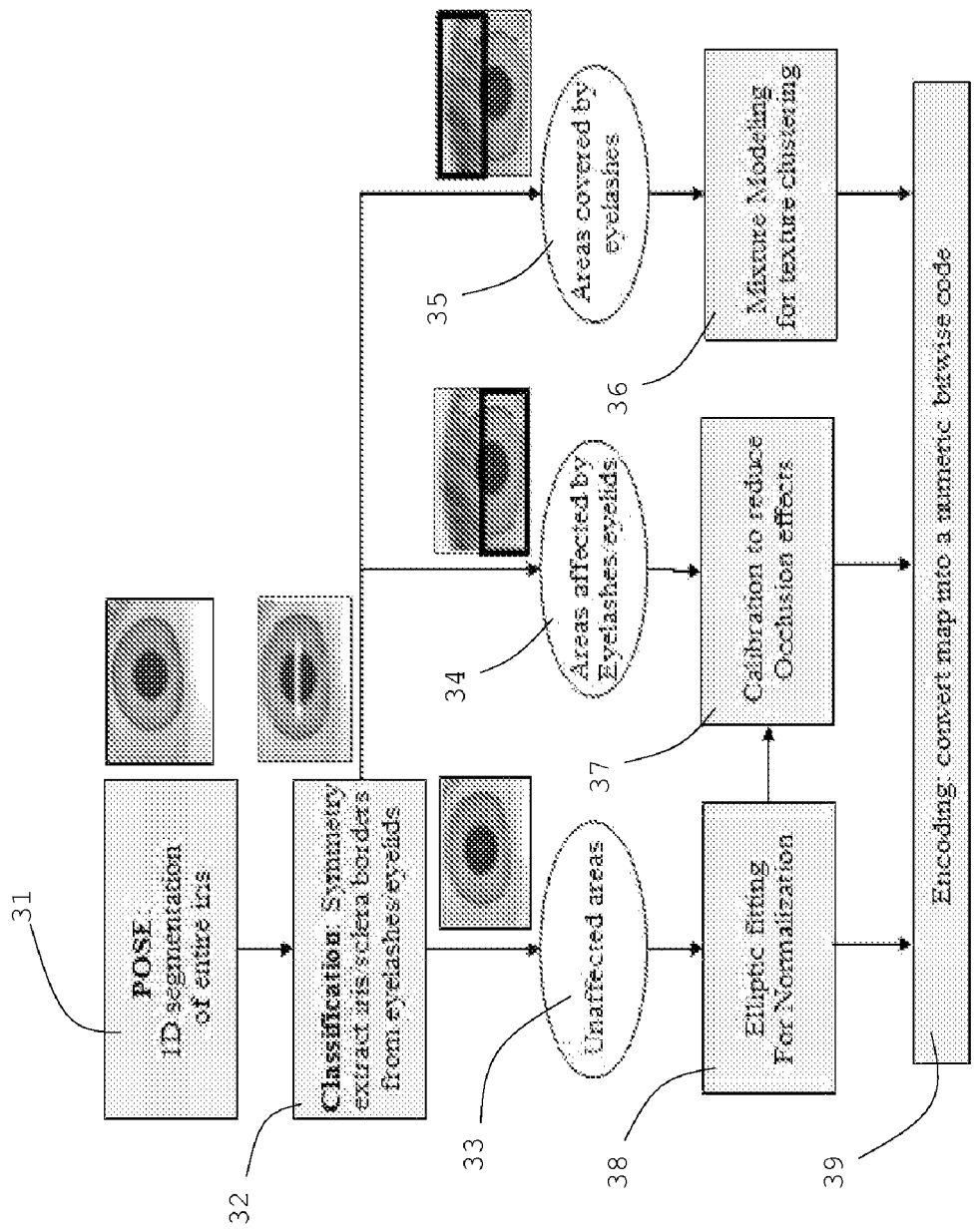
FIG. 9 shows an outline of segmentation of the iris into various regions and classifying the regions as unaffected and affected.

FIG. 9 shows a feature extraction 24 approach using POSE 31. Iris classification step 32 may use symmetry in POSE edges. POSE may or the related art may segment the iris 31 as long as it is visible. POSE may require only a portion not necessarily the entire iris be visible. For instance, the eyelids 17 and 18 and eyelashes 19 may normally occlude the upper and lower parts of the iris 13 region. The related art may make use of a Hough transform to solve the extraction of eyelashes 19 or eyelids 17 and 18 approximating the upper 18 and lower 17 eyelids with parabolic arcs. In performing the related-art edge detections, the derivative of horizontal direction may be adjusted for detecting the eyelids 17 and 18. This may work when the eye 10 or head is not tilted from the horizontal axis. In addition, there may be a number of problems with the Hough transform method. First, it may require thresholding to be chosen for edge detection, and this may result in critical edge points being removed, resulting in a failure to detect arcs (or even circles for the iris borders). Moreover, the Hough method may be computationally intensive due to its brute-force approach and thus may not be practical for the iris-at-a-distance application.

Figure 10:
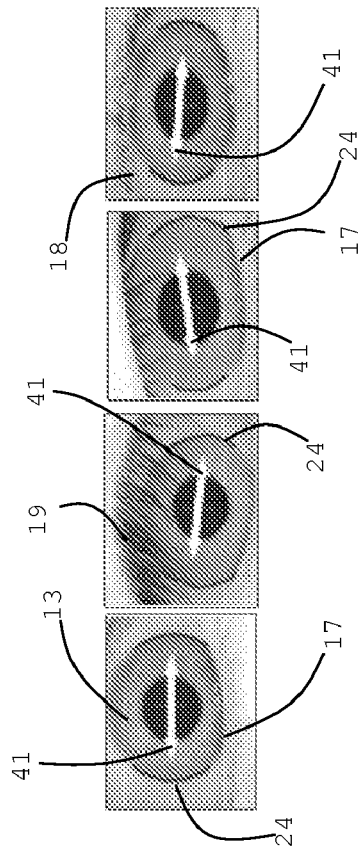
FIG. 10 shows the symmetric portion of the iris representing the non-occluded areas where the borders of the iris and sclera are visible.

An approach may be introduced for detecting the orientation of the eye 10 without having to add extra processes. This approach may be based on detecting the symmetry of the POSE resulting edge points. As shown in FIG. 10, the symmetric portion 41 of the iris 13 may represent the non-occluded areas where the borders of the iris 13 and sclera are clearly visible. One may indicate that the asymmetric regions represent the eyelids 17 and 18 and eyelashes 19 (obviously the asymmetry is due to occlusion of the sclera). There may be an iris image classification using asymmetry in detected POSE edges. This technique may provide a way to identify best visible iris areas from affected areas. The affected area may be either masked out or subjected to further analysis to extract more texture patterns if deemed necessary.

Figure 11:
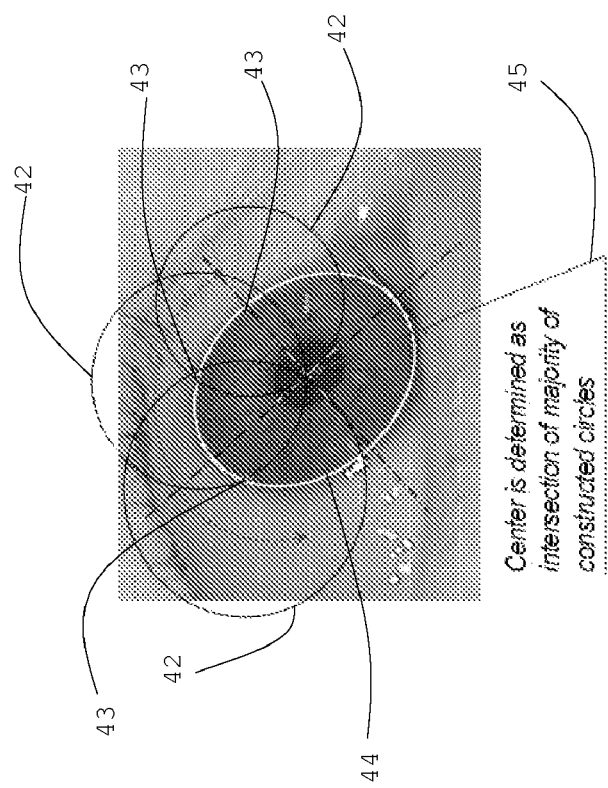
FIG. 11 shows a determination of the center of the ellipse with an intersection of circles and an elliptic fitting scheme.

The elliptic-fitting step 38 based normalization may be used, as noted in FIG. 9 and introduced in FIG. 11. Firstly, the edge map may be generated by radially POSE segmentation over all angles. The symmetric points 43 of the edge map may then be selected for the normalization process. From these symmetric arc points 43, votes may be cast in within POSE space (i.e., ranges are predefined by POSE edge map) for the parameters of variable circles 42 passing through each edge point 43 of the symmetric arcs. The ellipse 44 detection scheme may then be based on the overlapping of these variable circles 42. These edge points 43 may be used as the center coordinates of these variable circles 42 which are able to define any circle according to the equation, $$r^2 = (x-x_o)^2 + (y-y_o)^2$$

The circle radius may vary based upon how distant the center from the extreme edge point as shown in FIG. 11. The corresponding radius variation may be computed as $$r\frac{dr}{dy} = (y - y_o)(1 - (a/b)^2)$$

and the resulting radius for each iteration may be defined as $$r_k = \sqrt{a_k^2 - (1 - a_k^2/b^2)(b-dy)^2}$$

A maximum point in the POSE space may correspond to the intersection of majority of constructed circles and thus to the corresponding radii and center 45 of the ellipse 44 as illustrated in FIG. 11.

Calibration may be used to reduce occlusion effects. An automatic POSE segmentation model may prove to be successful in detecting virtually all iris regions including area portions occluded by the eyelid 17 or 18. However to conduct an accurate normalization to bring the analysis into uniformity and make significantly accurate matching against templates in the database, one may need to resample the points detected along the radial axis based on the actual radius of the iris 13 and not on the detected one as it does not represent the complete radius. Thus, measurements may be adjusted and rescaled accordingly based upon the best elliptic fitting to the edge map points detected in the nominal areas (i.e., symmetric edges). The approach may be shown in the following steps.

First, one may estimate the ellipse parameters from nominal map edges with the following, $$\left(\frac{x-x_o}{a}\right)^2 + \left(\frac{y-y_o}{b}\right)^2 = 1$$

Second, for all angles θ, one may compute calibration factor, as follows, $$\lambda = \frac{\tilde{r}}{r}; \text{ given that } r = \sqrt{\left(a^{-2} + \left(\frac{\tan^2\theta}{b^2}\right)\right)^{-1}(1+\tan^2\theta)}$$

Third, one may rescale the map based upon calibration factors.

Figure 12:
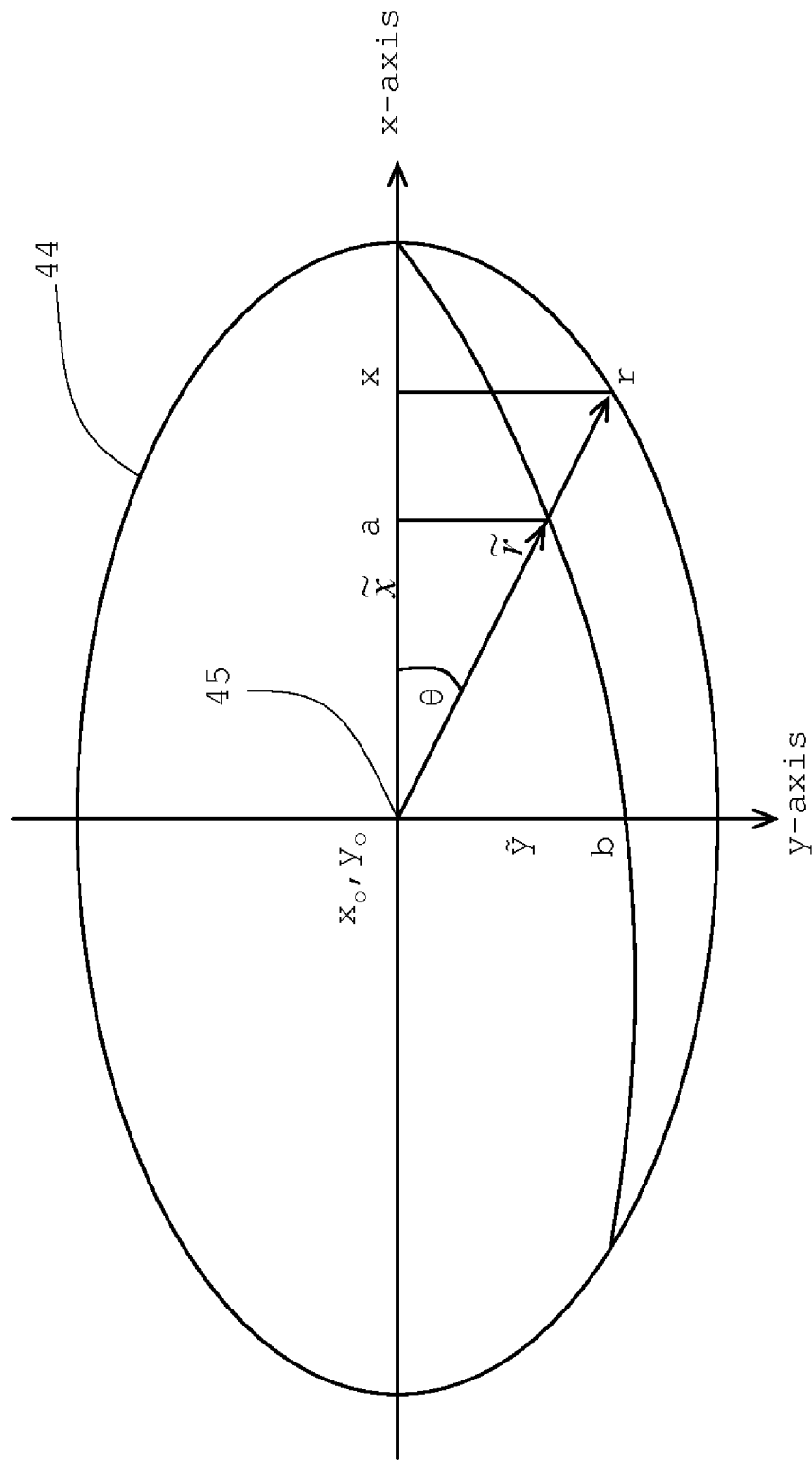
FIG. 12 relates to an adjustment/calibration of an iris radial longitude.

One may have an adjustment/calibration of the iris radial longitude. FIG. 12 and its notation may be observed.

$$(y-y_o)=(x-x_o)\tan\theta$$

$$r^2=(x-x_o)^2+(y-y_o)^2$$

$$r^2=(x-x_o)^2(1+\tan^2\theta)$$

$$((x-x_o)/a)^2+((y-y_o)/b)^2=1$$

$$((x-x_o)/a)+\tan^2\theta/b^2(x-x_o)^2=1$$

$$(1/a^2+\tan^2\theta/b^2)(x-x_o)^2=1$$

$$(x-x_o)=(1/a^2+\tan^2\theta/b^2)-1$$

$$r^2=(1/a^2+\tan^2\theta/b^2)^{-1}(1+\tan^2\theta)$$

The present technique is well suited for iris-at-a-distance. Such operations may include subjects captured at variant ranges from the acquisition device or may not have their eye directly aligned with the imaging equipment. Usually for such applications, it is difficult to implement the level of controls required by most of the related art to enable reliable iris recognition operations. The present concept here may cope with asymmetry in acquired iris imaging and it may operate under much any uncontrolled operations as long as some of the iris annular is visible. A purpose of the present system is to have capabilities in iris recognition as applied to more unconstrained iris capture in rather diverse environments. The present analyses may detect many sorts of boundaries, including irregular and non-elliptic boundaries, i.e., it may detect geometrically and biologically distorted images. The present approach may handle most any line-of-sight boundaries at the far side of a significantly rotated head level iris. The pupil 11 region is not necessarily concentric with the iris 13 region and may usually be slightly nasal.

Reliable iris recognition technology may be a reality. However, computing iris features requires a good-quality segmentation process that focuses on the iris boundaries extraction.

In the related art, it may usually be difficult to implement the level of controls required in that art to enable reliable recognition operations. The major challenges when dealing with such application of uncontrolled operations may include closure, occlusion, and artifacts due to subjects not having their eye 10 aligned with the imaging equipment.

The present system may improve the capabilities of POSE as to application to quite unconstrained iris 13 capture in more diverse environments where occlusions and irregularities are expected. The preprocessing approach here may be based on perspective orientation that addresses these deformations in image acquisition. One may assume a perspective projection model to provide an estimate of the geometric view of the actual face from the camera perspective.

POSE may map the analysis at an early stage into the polar domain. By conducting segmentation in the polar domain, one may be led to a more efficient and faster process to execute not only segmentation plus calibration and noise removal in one single step to generate the feature amp for the encoding scheme.

A least squares solution may used for the iris fitting step. The general quadratic curve equation, $$ax^2+2bxy+cy^2+2dx+2fy+g=0,$$

is an ellipse, upon defining $$\Delta = \begin{vmatrix} a & b & c \\ b & c & f \\ d & f & g \end{vmatrix},$$

$$J = \begin{vmatrix} a & b \\ b & c \end{vmatrix}, \text{ and}$$

$$I = a+c.$$

For simplicity, one may rescale the equation by dividing the constants by g, assuming $g \neq 0$, thus:

$$\vec{V} = \left[ \frac{a}{g} \frac{b}{g} \frac{c}{g} \frac{d}{g} \frac{f}{g} \right]^T,$$

let g=1, and
measurement k may be formulated as follows:

$$m_k = [x_k^2 \, 2x_k y_k \, y_k^2 \, 2x_k \, 2y_k] \vec{V}$$

$\forall k=1 \to N$ measurements, for each measurement $(x_k, y_k)$, one may define $\vec{m}_k = [x_k^2 \, 2x_k y_k \, y_k^2 \, 2x_k \, 2y_k]$.

$$\text{Let } M = \begin{bmatrix} m_1 \\ m_2 \\ \vdots \\ m_N \end{bmatrix}, N \times 5 \text{ dim.}$$

One may solve for the ellipse 44 with $$\vec{V} = (M^T M)^{-1} M^T \vec{1}, \text{ where } \vec{1} = \begin{bmatrix} -1 \\ -1 \\ -1 \\ \vdots \\ -1 \end{bmatrix}, \text{ having an } N \times 1 \text{ dim.}$$

Assuming $\Delta \neq 0$, J>0, and $\Delta/I<0$. In that case, the center 45 for the ellipse 44 is $(x_o, y_o)$, where $$x_o = (cd-bf)/(b^2-ac),$$

$$y_o = (af-bd)/(b^2-ac),$$

the angle of rotation is $$\emptyset = \tfrac{1}{2} \cot^{-1}((c-a)/2b)$$

and the semi-axis lengths are $$a' = \{[2(af^2+cd^2+gb^2-2bdf-acg)]/(b^2-ac)[(c-a)(1+(4b^2/(a-c)^2)^{1/2}-(c+a)]\}^{1/2}, \text{ and}$$

$$b' = \{[2(af^2+cd^2+gb^2-2bdf-acg)]/(b^2-ac)[(a-c)(1+(4b^2/(a-c)^2)^{1/2}-(c+a)]\}^{1/2}.$$

Figure 13:
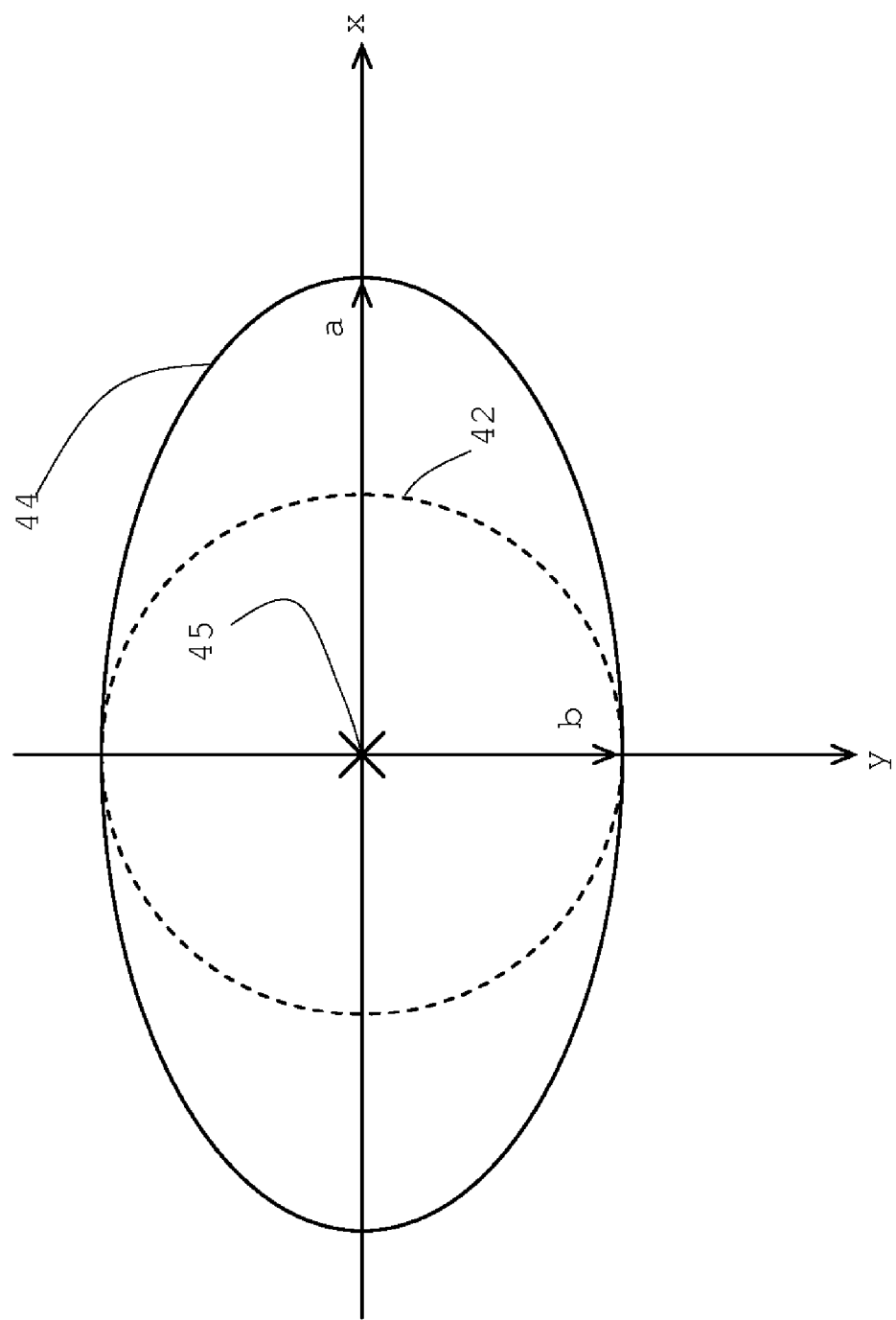
FIG. 13 is associated with a program for regenerating circles form ellipses.

Below is sketch of a program which may be applicable and scaled with a ratio a/b for regenerating circles from ellipses, in conjunction with FIG. 13.

function ellipse=find_me_ellipse(edges, rmin, rmax, num)

```
%*********************************************************************
**
%ellipse = find_me_ellipse(edges, rmin, rmax) -- returns the coordinates
%                         of ellipse in an image using a simplified version of
                          Hough transform to detect overlapping circles at the
                          center.
%                         The image may be rescaled to transfer elliptic shapes
                          into circular shapes so that existing technology of
                          circular fitting can be applied to locate elliptic
                          center and eventually elliptic parameters as illustrated
                          herein.
%
%INPUTS:
%        edges            - the image in which to find ellipses
%        rmin             - lower radius to search for
%        rmax             - upper radius to search for
%        num              - number of points to search for the ellipse shape
%OUTPUTS:
%        ellipse.x,.y.r                  - ellipse coordinates
%*********************************************************************
**
[rows, cols] = size(edges);
if ~exist('rmin'), rmin = 5; end;
if ~exist('rmax'), rmax = round((min(cols,rows))/2); end;
amax                    = rmax(1);
ellipse.x               = 1;
ellipse.y               = 1;
```

```
-continued
ellipse.a            = 0;
ellipse.b            = 0;
ratioMax             = amax/bmax;
ratioMin             = amin/bmin;
ratio                = ratioMin:(ratioMax−ratioMin)/(num−1):ratioMax;
nradii               = (bmax−bmin+1);
% perform the circular Hough transform
hough = hough_circle(edges, bmin, bmax, ratio);
maxtotal = 0;
% find the maximum in the Hough space,
%                    and hence the parameters of the circle
for k=1:num,
    scale = hough(:,:,n, k);
    for n+1:nradii
                    layer = hough(:,:,n, k);
                    maxlayer = max2(layer);
                    if maxlayer > maxtotal
                    maxtotal = maxlayer
                    radius = bmin+n−1;
                    [row,col] = find(layer == maxlayer);
                    ellipse.y = row(1);
                    ellipse.x = round(col(1)*scale);
                    ellipse.b = radius;
                    ellipse.a = round(radius*scale);
                    end % if;
    end; % for n
end; % for scale.
%=========================================================================
==
function hough = hough_circle(edges, rmin, rmax, ratio)
%=========================================================================
==
% h = hough_circle(edge_img, rmin, rmax)
%                    - takes an edge map image, and performs the Hough transform
%
% INPUTS:
%       edges:              the edge map image
%       rmin, rmax          limit search to this minmax range.
%
% OUTPUTS:
%       hough:              Hough transform
%*************************************************************************
**
[rows,cols]        = size(edges);
[rowList, colsList] = find(edges ~=0);
len                = length(rowsList);
nradii             = (rmax−rmin+1);
num                = length(ratio);
hough              = zeros(rows,cols,bradii, num);
% for each scale,
for k = 1:num
    scale   = ratio(k);
    XList   = round(colsList/scale);
    %for each edge point, draw circles of different radii
    for index=1:len,
        circle.y = rowsList(index); % def circle coordinates
        circle.x = XList(index);
        for n=1:nradii
            circle.r = n+rmin−1;
            hough(:, :, n, scale) = add_circle(hough(:, :, n, scale),
circle);
        end % for n
    end % for index
end; %scale
%
```

Texture segmentation may be accomplished using a mixture modeling (MM) technique. Segmentation may have originated in the related art based on a mixture of normals representation at the pixel level. This method may feature a far better adaptability to scene understanding and may handle even bimodal backgrounds (i.e., means to discarding moving objects of non-interest in a dynamic scene). In an attempt to mediate the computational burden required by the just noted approach, an adaptive mixture modeling approach may be implemented at the block level instead of pixel level analysis and simplified divergence measures may be introduced between the normals of incoming pixels/blocks and existing model distributions. Both alternatives may feature a far better adaptability to changes in image content and handle complex scenes.

Here, one may introduce a modification of mixture modeling approach of these two above-mentioned alternatives to handle the variation in the iris textures to take advantage of the statistical MM capabilities. The present approach may use a multi-normal representation at the pixel level. However, in the present approach, one does not necessarily model the pixels/blocks over-time; instead, one may model a block of pixels spatially with initialization executed on a predefined region of interest part of the iris area.

One may use the present histogram based approach for statistical distribution initialization instead of the related art approaches involving approximation, or expectation-maximization (EM) algorithm. In contrast to both EM and the approximation, the present histogram algorithm may provide more reliable initial statistical support that facilitates fast convergence and stable performance of the distribution classification.

One may also introduce an apparently reliable divergence measure as a modification to the spectral information divergence (SID) measure and relative entropy (RE) measure. The present divergence measure may be a simplified version of the SID measure used to match criterions between normals of scanned pixels and existing model normals. The measure may be a far superior measure to the fixed value (2-standard deviations), and much more reliable than the predefined STD. The measure may be for dual use, as described below, for the segmentation of the iris texture as well as for measuring similarities between iris signatures.

In the iris texture analysis, for every scanned pixel, one may check whether there is a match or non-match using the new divergence information measure. When a match is found, the model update may be performed using the first-in-first-out (FIFO) method while updating the weights of the model mix. When a match is not found, the update may be performed in a way that guarantees the classification of the scanned distribution in the outer set, associated with the eyelashes 19 or eyelid 17, 18 regions (non-iris region).

The present mixture modeling based concept may allow one to identify the eyelashes 19 and eyelids 17 and 18 pixels in each iris image while updating the description of each class of the iris texture's mixture model. The matched pixels may then be assembled into a continuous texture using a generic connected component algorithm.

Initialization 51 may be performed. A goal of the initialization phase is to set initial statistical parameters for the pixel clusters corresponding the iris 13 and non-iris 50 regions with reasonable values that represent their classes' distributions. These initial values may be used as a starting point for the dynamic changes in the pixel values across the iris 13 region and non-iris 50 regions. One may extract a predefined region 52 of the iris 13 based upon the symmetry based classifier with a sufficient number of pixels and then process them before expanding to the rest of the image. Each pixel 54 of the selected sub-region X may be considered as a mixture of three spatial-varying normal distributions:

$$X \sim \sum_i \omega_i N(\mu_i, \Sigma_i)$$

where $$0 \leq \omega_i \leq 1; \sum_i \omega_i = 1$$

are the mixing proportions weights of the X variations within the iris region perspective. The notation $N(\mu_i, \Sigma_i)$ may represent a normal distribution with mean $\mu$ and covariance matrix $\Sigma$. For simplicity, one may consider in the present analysis that neighboring pixels are not correlated with each other and with identical standard deviation, thus the covariance matrix may be simplified to a scalar multiple of the identity matrix, i.e., $N(\mu_i, \sigma_i)$.

Figure 14:
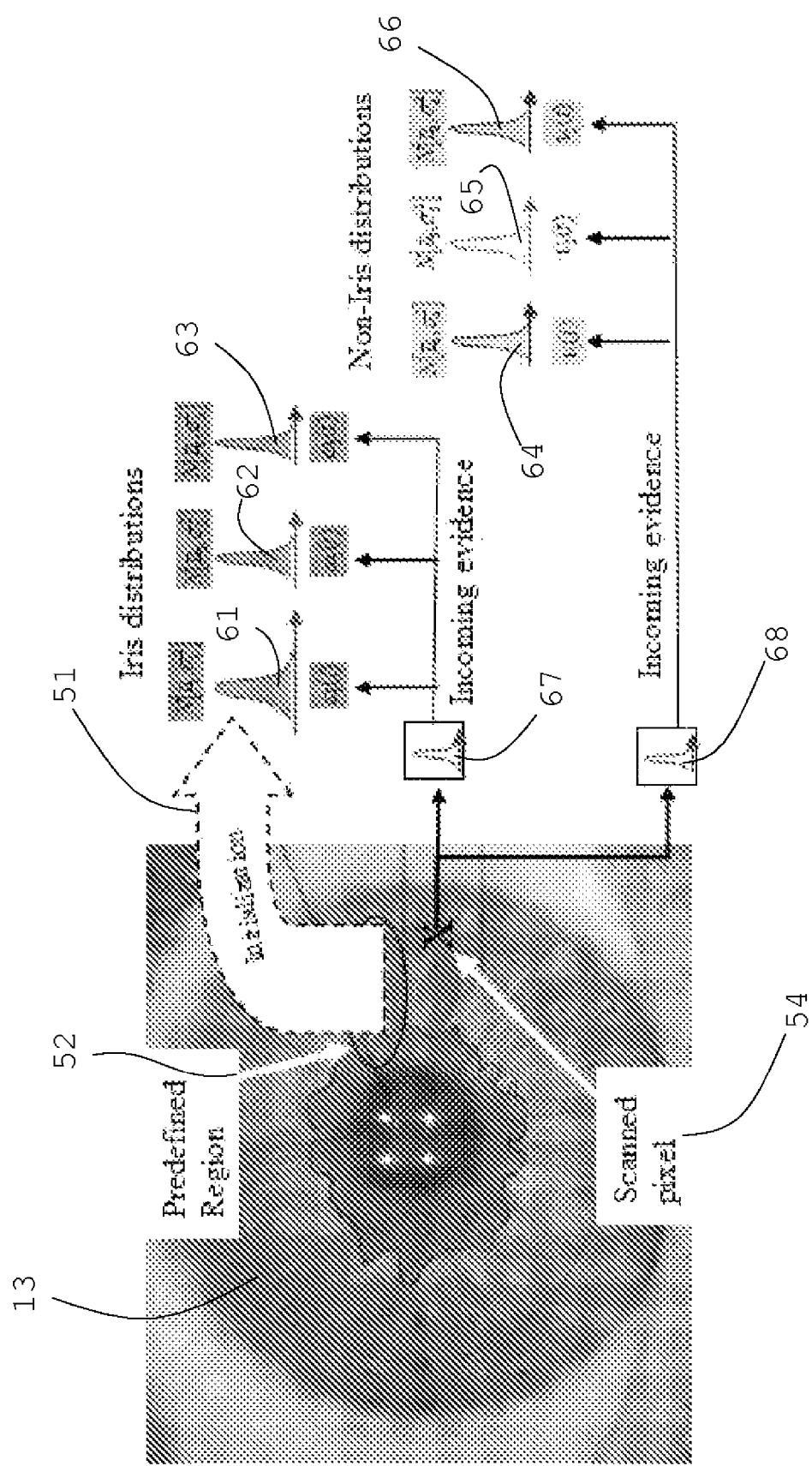
FIG. 14 may show a visualization of the mixture modeling approach as applied to iris segmentation.

The initialization 51 in FIG. 14 may reveal iris distributions $N(\vec{\mu}_1, \sigma_1^2)$, $N(\vec{\mu}_2, \sigma_2^2)$, and $N(\vec{\mu}_3, \sigma_3^2)$ as designated by 61, 62 and 63, respectively. Incoming evidence 67 from scanned pixel 54 may contribute $\omega_1(I)$, $\omega_2(I)$ and $\omega_3(I)$ to distributions 61, 62 and 63, respectively. There may non-iris distributions $N(\vec{\mu}_4, \sigma_4^2)$, $N(\vec{\mu}_5, \sigma_5^2)$ and $N(\vec{\mu}_6, \tau_6^2)$, as designated by 64, 65 and 66, respectively. Incoming evidence 68 from scanned pixel 54 may contribute $v_1(t)$, $v_2(t)$ and $v_3(t)$ to distributions 64, 65 and 66, respectively.

Related mixture modeling methods may initialize the pixel values either with random numbers, an approximation algorithm, or EM algorithm. The related art initialization methods appeared to be applied to time-varying distribution and even then did not appear to prove practical in most scenarios as they all appear to result in slow learning (approximation) and crude estimates (EM algorithm—a very computationally intensive technique) which usually may result into very biased results unless a large number of pixels is considered to bring the initialization phase under control. In contrast to the related art, and to avoid computational burden, one may presently make use of a very simple yet powerful method of clustering the accumulated pixels based upon their histogram and approximate their distribution based upon the variation in the histogram contrast. One may obtain the estimates of the three distributions by clustering the collected pixels into three classes that center within each class with largest dissimilarity among the three clusters. The weights may be linearly scaled based upon the fraction of pixels of each individual class with respect the overall accumulated pixels. The result may be a mixture model for three normal distributions per iris pixel with initial weights. These normal distributions may represent three potential different states for each iris pixel. One may intuitively claim that at least 3 classes are expected to categorize the depicted gray-scale iris pixels due to eyelash covering some of the iris regions as well as the texture within the iris may be categorized into at least 3 levels or classes of contrast. In experiments, the present histogram based clustering technique has appeared to prove a superior initialization method that caters to fast learning and exceptional stability to the subsequent main stage of iris segmentation. This appears to be especially true when initialization 51 happens in a not well predefined iris initial region.

It may be important to note that in both during initialization 51 and subsequent processing, one may chose to represent each iris pixel component of a pixel as a mixture of a predefined number (e.g., three may be used throughout the experiments) of normal distributions. One may arrive at this choice (i.e., K=3) after experimenting with clustering the resulted pixel contrast using the present optical and acquisition system. However, other system arrangements may require larger number of classes to cover the dynamic changes within the iris texture contrast variations. From various experiments, it appears that three normals per iris may be a sufficiently rich representation scheme to capture natural texture variation. Adding more normals appears to simply increase the computational load without improving the quality of segmentation.

One may have mixture model based iris segmentation. The initial mixture model may be updated dynamically thereafter while scanning the entire image. The update mechanism may be based on new evidence (new scanned pixels). None of the existing iris distributions may be dropped or replaced. However, distributions' parameters may change as it is dynamically updated. As for the non-iris distributions 64, 65 and 66, one of the existing distributions may be dropped and replaced with a new distribution if there is no match. While scanning throughout the image, at every point in space the distribution with the strongest evidence may be considered to represent the pixel's most probable iris state.

FIG. 14 may present a visualization of the mixture of normals model. The Figure may also reveal the mixture modeling approach as applied to iris segmentation. The present procedure may be used to update the mixing proportions weights of the mixture models with no thresholds or learning parameters. When a match is found, the model update may be performed and weights may be updated using adaptive weighting. When a match is not found, the update may be performed in a way that guarantees the inclusion of the incoming distributions in the non-iris distribution set. Once the minimum number of occurrence is reached, the least weighted distribution of non-iris may be replaced with the new most frequent distribution.

The algorithm may work as follows. First, the existing distributions of the predefined region of the iris may be initialized and weights may be determined based upon the fraction of the population set. Second, the algorithm may select the first $K_o$ distributions that account for eyelash 19, eyelids 17 and 18, limbic and other possible items. One may typically set $K_o=3$ associated with three possible non-iris regions (i.e., eyelash 19, eyelid 17, 18, limbic and so forth). Third, the algorithm may then check for any scanned pixel value to be ascribed to any of the existing normal distributions. The matching criterion that one may use is an information divergence measure which may be a key contribution of the present approach from other similar methods. A divergence measure may be described herein.

Fourth, the algorithm may update the mixture of distributions and their parameters. The nature of the update may depend on the outcome of the matching operation. If a match is found within the iris or non-iris distributions, then the matched distribution may be updated using the method of moments. If a match is not found and the minimum number is reached, then the weakest distribution of the non-iris may be replaced with a new distribution. If the minimum required number is not reached, a counter may be incremented without replacing any distributions. The update performed in this case may preserve the nature of the iris distribution mixture while guaranteeing the inclusion of the new distribution in the non-iris set, which may be an aspect of the present method. The matching and model updates operations may be quite involved and are described in detail in the following. There may be the information divergence measure. The SID information measure between two distributions $$f_i \sim N[\vec{\mu}_i, \sigma_i^2]$$

and $$g \sim N[\vec{\mu}_g, \sigma_g^2]$$

may be defined as:

$$J(f_i, g) = \int [f_i(x) - g(x)] \log\left(\frac{f_i(x)}{g(x)}\right) dx$$

The SID measure may be the symmetric measure of the relative entropy measure. The SID measure may be combined with the spectral angle mapper (SAM). For the purpose of the present algorithm, one may need to use the SID measure over the other measure because it is conjugative (i.e., symmetric around its arguments). The relative entropy which is usually a logical choice in most of divergence measurements does not appear to satisfy this property and thus is not necessarily used in the present approach. With little manipulation, one may show that $$J(f_i, g) = \frac{3}{2}\left(\frac{\sigma_i}{\sigma_g} - \frac{\sigma_g}{\sigma_i}\right)^2 + \frac{1}{2}\left(\frac{1}{\sigma_g^2} + \frac{1}{\sigma_i^2}\right)(\vec{\mu}_g - \vec{\mu}_i)^T(\vec{\mu}_g - \vec{\mu}_i)$$

In the related art, new scanned pixels data points may be modeled with fixed predefined distributions regardless of the application and operation conditions. The distribution may have had been assumed constant where these constants were based on some experimental observations. One may argue that the variance cannot be predefined as it varies with the operating environments; rather, one may provide better estimates of the incoming distribution that is dependent upon the current operations. One may formulate this approximation to simplify the $J(f_i,g)$ divergence measure and introduce a $H(f_i, g)$ divergence measure as more compact that results into similar results than the SID measure. Present estimates may be based on the fact that the incoming distribution is modeled as follows:

$$\mu_g = x_i \text{ and } \sigma_g^2 = \alpha_i \sigma_i^2$$

where $x_i$ is the scanned data point. The choice of variance may be expressed as a scalar. Plugging this equation into the measure equation may result into:

$$J(f_i, g) = \frac{3}{2}\left(\alpha_i - \frac{1}{\alpha_i}\right)^2 + \frac{1}{2\sigma_i^2}\left(1 + \frac{1}{\alpha_i^2}\right)(\vec{\mu}_g - \vec{\mu}_i)^T(\vec{\mu}_g - \vec{\mu}_i)$$

Based on the above assumptions, one may deduce the SID measure into a more compact information divergence measure. For instance, one may assume that $\alpha_i=1$; thus, the first term of the above measure is null, dropping the scalar 2 factor of second term as it would not affect the present comparison among all distributions when evaluated. This may result into a simple information measure (IM), given as follows:

$$\boxed{H(f_i, g) = \frac{1}{\sigma_i^2}(\vec{\mu}_g - \vec{\mu}_i)^T(\vec{\mu}_g - \vec{\mu}_i)}$$

Once all of the divergence measures have been calculated one may find the distribution for which:

$$H(f_o, g) = \min_i \{H(f_i, g)\}$$

and one may have a match between $f_o$ and $g$ if and only if $H(f_i,g) \leq \kappa$, where $\kappa$ is predefined cutoff value. This may apply for just the iris region matching. No thresholds are used if the match is in the non-iris region.

There may be a distribution update when there is a match. If the incoming distribution matches to one of the existing distributions, one may pool them together to a new normal distribution. This new normal distribution may be considered to represent the current state of the iris region or the non-iris region based upon the matched distribution and its associated category. In what follows, there may be described an effective approach to update the weights and the distribution parameters once there is a match $f_o$. The weights may be updated as follows:

$$\begin{cases} \omega_o(t) = \dfrac{100\,\omega_o(t-1) + 1}{101} \\ \omega_i(t)_{i \neq o} = \dfrac{100}{101}\omega_o(t-1) \end{cases}$$

One may make sure that the new weights still sum to 1, $$\begin{aligned}\sum \omega_i(t) &= \omega_i(t) + \sum_{i \neq o}\omega_i(t) \\ &= \frac{100}{101}\sum_{i \neq o}\omega_i(t-1) + \frac{100}{101}\omega_o(t-1) + \frac{1}{101} \\ &= \frac{100}{101}\left(\sum_{i \neq o}\omega_i(t-1) + \omega_o(t-1)\right) + \frac{1}{101} \\ &= \frac{100}{101} + \frac{1}{101} \\ &= 1;\end{aligned}$$

To update the distribution parameters, one may introduce a learning parameter $\epsilon$ which is depicted as $$\varepsilon = 1 - \frac{H(f_o, g)}{K_{opt}}$$

Although it has been stated intuitively that $K_{opt}$ may be inversely driving the selection of the learning parameter without formulating the relationship between the two variables, one may argue here that the actual driver of the learning parameter is the resulting divergence measure and how similar the incoming distribution is to the matched class. The constant $K_{opt}$ should not be varying so as not to bias the overall measurement. One may here introduce a relationship between the two quantities and establish a guideline on how to set the learning parameter. This may also be a key contribution of our overall algorithm that works much more efficiently then many other approaches. Using the method of moments, one may get:

$$\mu_i(t) = \epsilon\mu_i(t-1) + (1-\epsilon)\mu_g$$

$$\sigma_i^2(t) \cong \sigma_i^2(t-1) + (1-\epsilon)\sigma_g^2 + \epsilon(1-\epsilon)(x(t)-\mu_i(t-1))^T(x(t)-\mu_i(t-1))$$

while the unmatched distributions keep the same parameters as were previously set.

There may be a distribution update when there is a no-match. In the case where a match is not found, that is, where all divergence measures were found to be significantly bigger with respect to the $K_{opt}$ value, no updates are conducted and a scanned pixel is considered to represent another cluster of pixels other than the iris region.

Figure 15A:
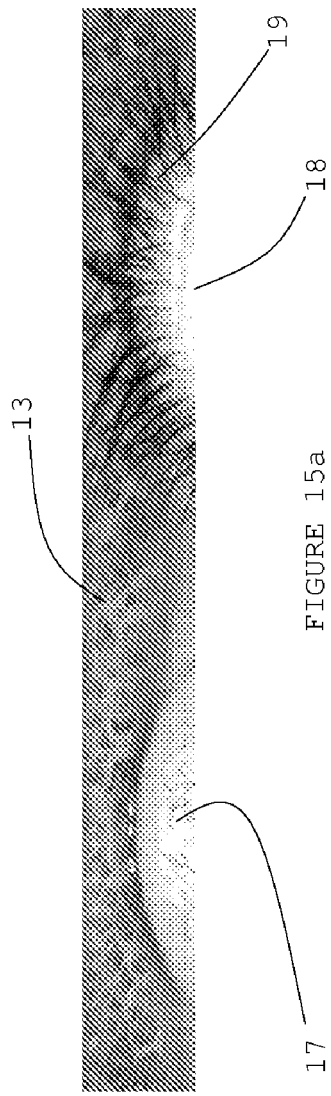
FIGS. 15*a*, 15*b* and 15*c* show a mixture modeling based analysis.
Figure 15B:
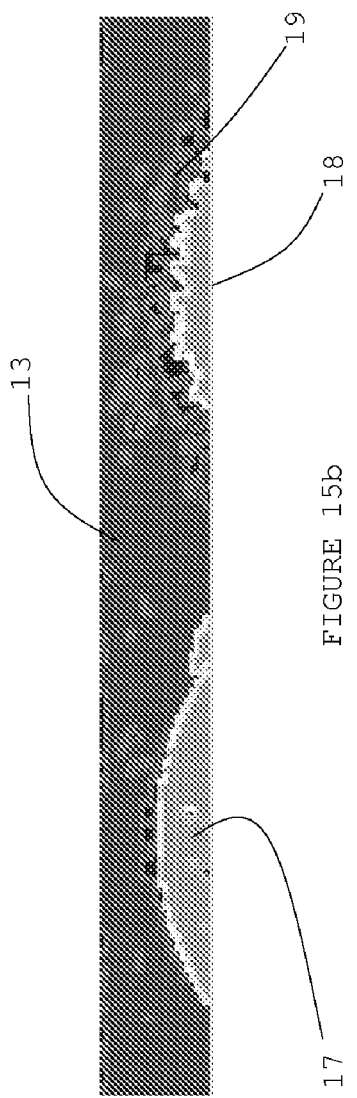
Figure 15C:
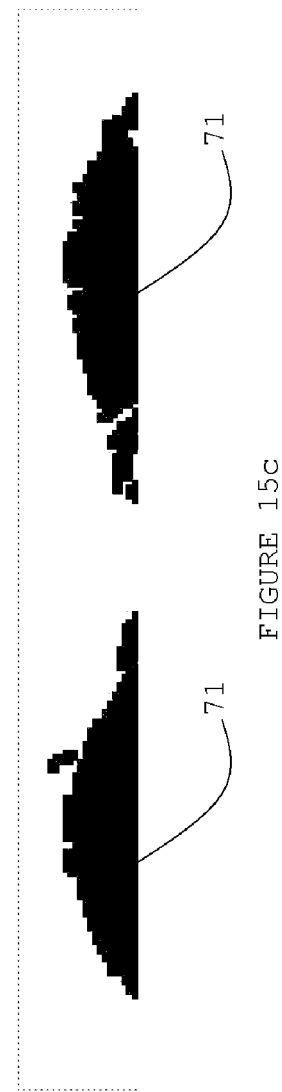
Figure 16A:
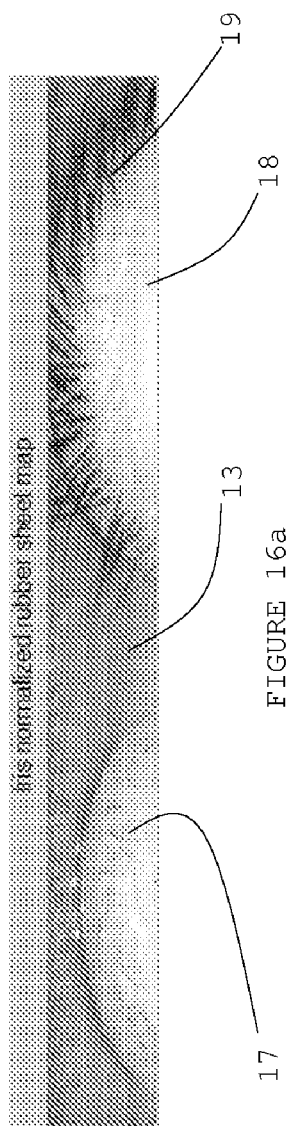
FIGS. 16*a*, 16*b* and 16*c* show another mixture modeling based analysis.
Figure 16B:
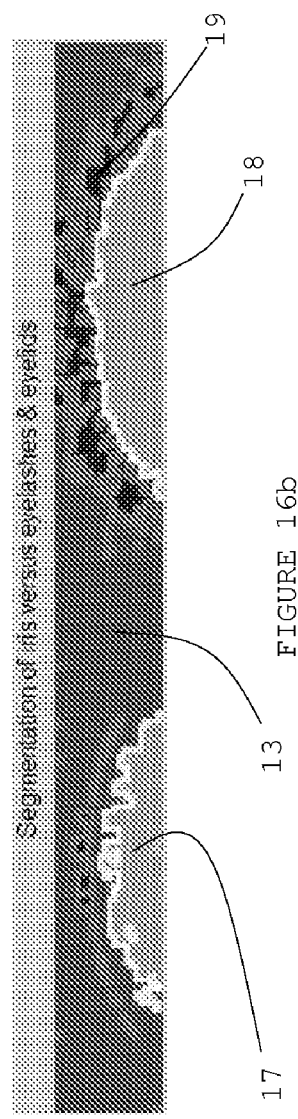
Figure 16C:
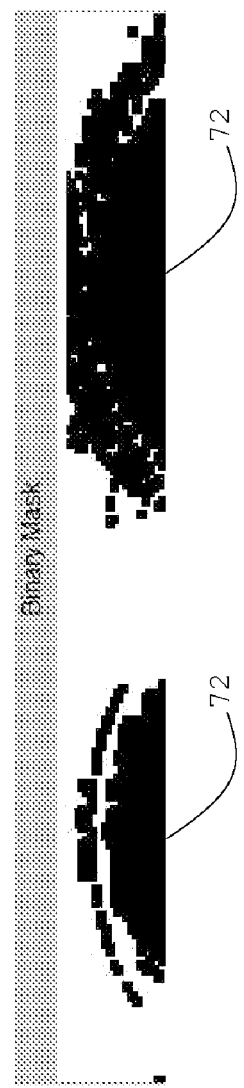

Relative to experiments and their results, the following may be noted. FIGS. 15a, 15b and 15c show a mixture modeling based analysis. FIG. 15a may here be regarded as a resulting rubber sheet map with respect to the pupil 11. FIG. 15b shows a mixture modeling based segmentation. For illustrative purposes, the iris 13 may be presented in red, the eyelid 17, 18 in green, and the eyelash 19 in blue. One may notice that the eyelash 19 covering the iris 13 may then be presented by the purple color as the mix of both red and blue. FIG. 15b may be regarded as revealing a segmentation of iris 13 versus eyelashes 19 and eyelids 17 and 18. FIG. 15c shows a deduced (binary) mask 71 representing the eyelashes 19 and eyelids 17 and 18. FIGS. 16a, 16b and 16c also show a mixture modeling based analysis. FIG. 16a shows an iris 13 normalized rubber sheet map. FIG. 16b shows a segmentation of iris 13 versus eyelashes 19 and eyelids 17 and 18. FIG. 16c shows a binary mask 72 representing the eyelashes 19 and eyelids 17 and 18.

In summary, there may an acquiring an image of an eye, an estimating a center of the pupil, an identifying a border of the pupil, an adjusting the center of the pupil, and a segmenting an iris from the border of the pupil to at least an outside border of the iris. One may further estimate a shape of the iris. In some examples, there may be an adjustment an eye image orientation perspective based on availability of face orientation angles. It may be noted that the terms "region" and "area" may be used interchangeably. These terms may be used interchangeably with "segment".

The border of the pupil may be an inside border of the iris. The shape of the iris may be estimated as a regular shape while extracting the irregular actual shape of the inside border and the outside border of the iris. There may be two symmetric segments from a curvature perspective opposite of each other encompassing the pupil border and the outside border of the iris. There may be an identifying the border of the pupil with a snake delineation of the border of the pupil and the outside border of the iris. The snake delineation may be performed with one dimensional segmentation. The one dimensional segmentation may be performed in a polar domain originating at about the center of the pupil. The border of the pupil and the outside border of the iris may be irregular shapes. The irregular shapes may be normalized in a polar map.

The shape of the iris may be classified into unaffected regions and affected regions which can be normalized. The scaling for the normalizing of the affected regions may vary based on an obscuration by extraneous objects of the affected regions. One may identify symmetric segments of the unaffected regions. The affected regions may have obscured affected regions and non-obscured affected regions. There may be clustering to divide the affected regions into obscured affected regions and non-obscured affected regions. The clustering may be texture clustering using mixture modeling. The obscured affected regions may be masked.

The non-obscured affected regions may be a part of a fitting mechanism. An irregular actual shape may be estimated from unaffected regions and non-obscured affected regions as a regular shape. The irregular actual shape may be estimated from unaffected regions and non-obscured affected regions as a regular shape with a least square fitting approach applied to an elliptic quadratic curve. The least square fitting approach may include scaling the regular shape from ellipses to circles, performing a transform to determine at least one parameter, and scaling the circles back to ellipses.

An irregular actual shape may be estimated from unaffected regions and non-obscured affected regions as a regular shape with elliptic fitting using overlapping variable circles.

An irregular actual shape may be estimated from unaffected regions and non-obscured affected regions as a regular shape with a scaling mechanism to transfer an elliptic fitting approach into a circular fitting approach.

One may assign weighting to the unaffected regions and the affected regions. Hamming distance may be one of several approaches that may be used. The affected regions and the unaffected regions may be encoded into symmetric bins and asymmetric bins, respectively. There may be matching of the symmetric bins and asymmetric bins with symmetric bins and asymmetric bins of other irises. A weighting accorded a match of the symmetric bins may be significantly greater than a weighting accorded a match of the asymmetric bins. A weighting accorded a match of the symmetric bins with non-symmetric bins or vice versa, may be less than a weighting accorded a match of symmetric bins with symmetric bins or vice versa, and may be greater than a weighting accorded a match of the non-symmetric bins with non-symmetric bins.

Figure 17:
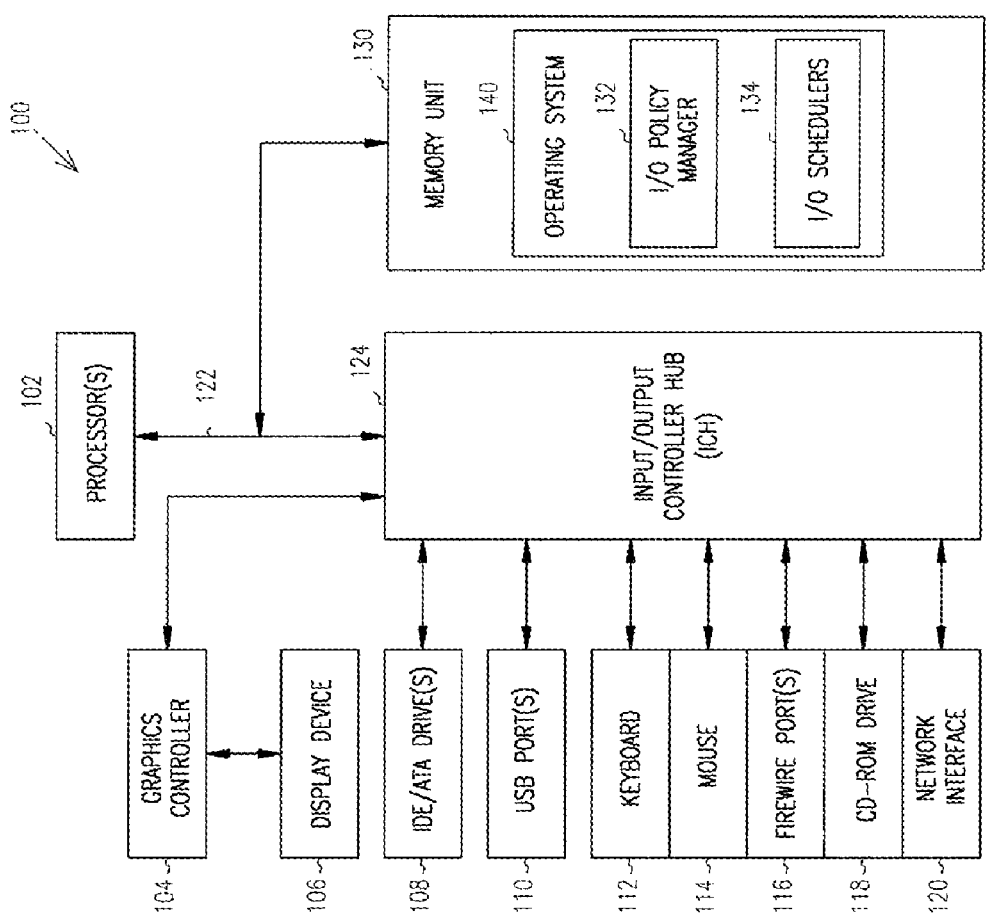
FIG. 17 illustrates an example computer system usable in conjunction with certain illustrative instances of the present system.

FIG. 17 illustrates an example computer system usable in conjunction with certain illustrative instances of the invention. Computer system 100 may have processor(s) 102. The computer system 100 may also include a memory unit 130, processor bus 122, and input/output controller hub (ICH) 124. The processor(s) 102, memory unit 130, and ICH 124 may be coupled to the processor bus 122. The processor(s) 102 may have a suitable processor architecture. The computer system 100 may have one, two, three, or more processors, any of which may execute a set of instructions in accordance with illustrative examples of the present invention.

The memory unit 130 may include an operating system 140, which includes an I/O scheduling policy manager 132 and I/O schedulers 134. The memory unit 130 may store data and/or instructions, and may comprise any suitable memory, such as a dynamic random access memory (DRAM), for example. The computer system 100 may also include IDE drive(s) 108 and/or other suitable storage devices. A graphics controller 104 may control the display of information on a display device 106, according to the illustrative examples of the invention.

The input/output controller hub (ICH) 124 may provide an interface to I/O devices or peripheral components for the computer system 100. The ICH 124 may comprise any suitable interface controller to provide for any suitable communication link to the processor(s) 102, memory unit 130 and/or to any suitable device or component in communication with the ICH 124. For one instance of the invention, the ICH 124 may provide suitable arbitration and buffering for each interface.

For one example of the invention, the ICH 124 may provide an interface to one or more suitable integrated drive electronics (IDE) drives 108, such as a hard disk drive (HDD) or compact disc read-only memory (CD ROM) drive, or to suitable universal serial bus (USB) devices through one or more USB ports 110. For one instance, the ICH 124 may also provide an interface to a keyboard 112, a mouse 114, a CD-ROM drive 118, and one or more suitable devices through one or more firewire ports 116. The ICH 124 may also provide a network interface 120 though which the computer system 100 can communicate with other computers and/or devices.

In one example, the computer system 100 may include a machine-readable medium that stores a set of instructions (e.g., software) embodying any one, or all, of the methodologies for dynamically loading object modules described herein. Furthermore, software may reside, completely or at least partially, within memory unit 130 and/or within the processor(s) 102.

In the present specification, some of the matter may be of a hypothetical or prophetic nature although stated in another manner or tense.

Although the invention has been described with respect to at least one illustrative example, many variations and modifications will become apparent to those skilled in the art upon reading the present specification. It is therefore the intention that the appended claims be interpreted as broadly as possible in view of the prior art to include all such variations and modifications.

What is claimed is:

1. An iris recognition system comprising:
a camera for acquiring an image of an eye; and
a computer for estimating a center of a pupil of the eye, identifying a border of the pupil, adjusting the center of the pupil, segmenting an iris from the border of the pupil to at least an outside border of the iris, and estimating a shape of the iris; and
wherein:
the border of the pupil is an inside border of the iris;
the shape of the iris is estimated as a regular shape while extracting the irregular actual shape of the inside border and the outside border of the iris;
the computer is further for delineating symmetric segments from a curvature perspective opposite of each other encompassing the pupil border and the outside border of the iris;
the identifying the border of the pupil is a snake delineation of the border of the pupil and the outside border of the iris;
the snake delineation is performed with one dimensional segmentation;
the one dimensional segmentation is performed in a polar domain originating at about the center of the pupil;
the border of the pupil and the outside border of the iris are deployed in an analysis as irregular curves without further approximation to regular shapes; and
the irregular shapes are normalized in the polar map.

2. The system of claim 1, wherein the shape is estimated as an elliptic shape.

3. An iris recognition system comprising:
a camera for acquiring an image of an eye; and
a computer for estimating a center of a pupil of the eye, identifying a border of the pupil, adjusting the center of the pupil, segmenting an iris from the border of the pupil to at least an outside border of the iris, and estimating a shape of the iris; and
wherein:
the border of the pupil is an inside border of the iris;
the shape of the iris is estimated as a regular shape while extracting the irregular actual shape of the inside border and the outside border of the iris;

the computer is further for delineating symmetric segments from a curvature perspective opposite of each other encompassing the pupil border and the outside border of the iris;

the identifying the border of the pupil is a snake delineation of the border of the pupil and the outside border of the iris;

the snake delineation is performed with one dimensional segmentation;

the one dimensional segmentation is performed in a polar domain originating at about the center of the pupil;

the computer is further for classifying the shape into unaffected regions and affected regions and normalizing the unaffected regions and the affected regions; and scaling for the normalizing of the affected regions varies based on obscuration by extraneous objects of the affected regions.

4. The system of claim 3, wherein the computer is further for identifying symmetric segments of the unaffected regions.

5. The system of claim 4, wherein the affected segments comprise obscured affected regions and non-obscured affected regions.

6. The system of claim 5, wherein:

the non-obscured affected regions are part of a fitting mechanism; and an irregular actual shape is estimated from unaffected regions and non-obscured affected regions as an elliptic or regular shape.

7. The system of claim 5, wherein an irregular actual shape is estimated from an unaffected regions and non-obscured affected regions as an elliptic regular shape with a least square fitting approach applied to an elliptic quadratic curve.

8. The system of claim 5, wherein an irregular actual shape is estimated from an unaffected regions and non-obscured affected regions as an elliptic regular shape with elliptic fitting using overlapping variable circles.

9. The system of claim 5, wherein an irregular actual shape is estimated from an unaffected regions and non-obscured affected regions as an elliptic regular shape with a scaling mechanism to transfer an elliptic fitting approach into a circular fitting approach, and scaling the estimated circle back to elliptic regular shape.

10. The system of claim 5, wherein the computer is further for assigning weighting to the unaffected regions and the affected regions.

11. The system of claim 10, wherein the computer is further for encoding the affected regions and the unaffected regions into symmetric bins and asymmetric bins, respectively.

12. The system of claim 11, wherein the computer is further for matching the symmetric bins and asymmetric bins with symmetric bins and asymmetric bins, not necessarily respectively, of other irises.

13. The system of claim 12, wherein a weighting accorded a match of the symmetric bins is significantly greater than a weighting accorded a match of the asymmetric bins.

14. The system of claim 13, wherein a weighting accorded a match of the symmetric bins with non-symmetric bins or vice versa, is less than a weighting accorded a match of symmetric bins with symmetric bins or vice versa, and is greater than a weighting accorded a match of the non-symmetric bins with non-symmetric bins.

15. The system of claim 4, wherein the computer is further for clustering to divide the affected regions into obscured affected regions and non-obscured affected regions.

16. The system of claim 15, wherein the clustering is texture clustering using mixture modeling.

17. The system of claim 15, wherein the computer is further for masking the obscured affected regions.

18. An iris recognition system comprising:

a camera for acquiring an image of an eye; and a computer for estimating a center of a pupil of the eye, identifying a border of the pupil, adjusting the center of the pupil, segmenting an iris from the border of the pupil to at least an outside border of the iris, and estimating a shape of the iris; and wherein:

the border of the pupil is an inside border of the iris;

the shape of the iris is estimated as a regular shape while extracting the irregular actual shape of the inside border and the outside border of the iris;

the computer is further for classifying the shape into unaffected regions and affected regions and normalizing the unaffected regions and the affected regions; and scaling for the normalizing of the affected regions varies based on obscuration by extraneous objects of the affected regions.

19. The system of claim 18, wherein the computer is further for identifying symmetric segments of the unaffected regions.

20. The system of claim 19, wherein the affected segments comprise obscured affected regions and non-obscured affected regions.

21. The system of claim 20, wherein:

the non-obscured affected regions are part of a fitting mechanism; and an irregular actual shape is estimated from unaffected regions and non-obscured affected regions as an elliptic or regular shape.

22. The system of claim 20, wherein an irregular actual shape is estimated from an unaffected regions and non-obscured affected regions as an elliptic regular shape with a least square fitting approach applied to an elliptic quadratic curve.

23. The system of claim 20, wherein an irregular actual shape is estimated from an unaffected regions and non-obscured affected regions as an elliptic regular shape with elliptic fitting using overlapping variable circles.

24. The system of 20, wherein an irregular actual shape is estimated from an unaffected regions and non-obscured affected regions as an elliptic regular shape with a sealing mechanism to transfer an elliptic fitting approach into a circular fitting approach, and scaling the estimated circle back to elliptic regular shape.

25. The system of claim 20, wherein the computer is further for assigning weighting to the unaffected regions and the affected regions.

26. The system of claim 25, wherein the computer is further for encoding the affected regions and the unaffected regions into symmetric bins and asymmetric bins, respectively.

27. The system of claim 26, wherein the computer is further for matching the symmetric bins and asymmetric bins with symmetric bins and asymmetric bins, not necessarily respectively, of other irises.

28. The system of claim 27, wherein a weighting accorded a match of the symmetric bins is significantly greater than a weighting accorded a match of the asymmetric bins.

29. The system of claim 28, wherein a weighting accorded a match of the symmetric bins with non-symmetric bins or vice versa, is less than a weighting accorded a match of symmetric bins with symmetric bins or vice versa, and is greater than a weighting accorded a match of the non-symmetric bins with non-symmetric bins.

30. The system of claim 19, wherein the computer is further for clustering to divide the affected regions into obscured affected regions and non-obscured affected regions.

31. The system of claim 30, wherein the clustering is texture clustering using mixture modeling.

32. The system of claim 30, wherein the computer is further for masking the obscured affected regions.

33. An iris recognition system comprising:
   a camera for acquiring an image of an eye; and
   a computer for estimating a center of a pupil of the eye, identifying a border of the pupil, adjusting the center of the pupil, segmenting an iris from the border of the pupil to at least an outside border of the iris, and estimating a shape of the iris; and wherein:
   the border of the pupil is an inside border of the iris;
   the shape of the iris is estimated as a regular shape while extracting the irregular actual shape of the inside border and the outside border of the iris;
   the border of the pupil and the outside border of the iris are deployed in an analysis as irregular curves without further approximation to regular shapes; and
   the irregular shapes are normalized in the polar map.

34. The system of claim 33, wherein the shape is estimated as an elliptic shape.

35. The system of claim 33, wherein the computer is further for adjusting an eye image orientation using perspective projection based on availability of face orientation angles.

\* \* \* \* \*